US006243696B1

(12) United States Patent
Keeler et al.

(10) Patent No.: US 6,243,696 B1
(45) Date of Patent: Jun. 5, 2001

(54) AUTOMATED METHOD FOR BUILDING A MODEL

(75) Inventors: James D. Keeler; Eric J. Hartman; Devendra B. Godbole; Steve Piche; Laura Arbila; Joshua Ellinger, all of Austin; R. Bruce Ferguson, II, Round Rock; John Krauskop; Jill L. Kempf, both of Austin; Steven A. O'Hara, Round Rock; Audrey Strauss; Jitendra W. Telang, both of Austin, all of TX (US)

(73) Assignee: Pavilion Technologies, Inc., Austin, TX (US)

( * ) Notice: Subject to any disclaimer, the term of this patent is extended or adjusted under 35 U.S.C. 154(b) by 0 days.

(21) Appl. No.: 09/047,853

(22) Filed: Mar. 24, 1998

Related U.S. Application Data

(63) Continuation-in-part of application No. 08/915,850, filed on Aug. 21, 1997, now Pat. No. 6,002,839, which is a continuation of application No. 08/576,581, filed on Dec. 22, 1995, now abandoned, which is a continuation of application No. 08/008,218, filed on Jan. 25, 1993, now Pat. No. 5,479,573, which is a continuation-in-part of application No. 07/980,664, filed on Nov. 24, 1992, now abandoned.

(51) Int. Cl.[7] .............................. G06E 15/18; G06E 1/00
(52) U.S. Cl. ............................. 706/21; 706/906; 706/907
(58) Field of Search ............................. 706/21, 906, 907

(56) References Cited

U.S. PATENT DOCUMENTS

| | | | |
|---|---|---|---|
| 4,910,691 | * | 3/1990 | Skeirik .................................. 706/45 |
| 4,965,742 | * | 10/1990 | Skeirik ................................. 706/906 |
| 5,006,992 | * | 4/1991 | Skeirik .................................. 706/58 |
| 5,111,531 | * | 5/1992 | Grayson et al. ....................... 706/21 |

(List continued on next page.)

FOREIGN PATENT DOCUMENTS

| | | | |
|---|---|---|---|
| 0262647A3 | * | 9/1986 | (EP) . |
| 0327268A2 | * | 2/1988 | (EP) . |
| WO92/17951 | * | 4/1991 | (WO) . |

OTHER PUBLICATIONS

"A Model for Temporal Correlation of Biological Neuronal Spike Trains," David C. Tam and the late Donald H. Perkel, *IJCNN International Joint Conference of Neural Networks*, Department of Physiology and Biophysics, University of California, Irvine, CA 92717, pp. I–781–I–786.

(List continued on next page.)

*Primary Examiner*—George B. Davis
(74) *Attorney, Agent, or Firm*—Howison, Chauza, Thoma, Handley & Arnott, L.L.P.

(57) ABSTRACT

A method for building a model of a system includes first extracting data from a historical database (310). Once the data is extracted, a dataset is then created, which dataset involves the steps of preprocessing the data. This dataset is then utilized to build a model. The model is defined as a plurality of transforms which can be utilized to run an on-line model. This on-line model is interfaced with the historical database such that the variable names associated therewith can be downloaded to the historical database. This historical database can then be interfaced with a control system to either directly operate the plant or to provide an operator an interface to various predicted data about the plant. The building operation will create the transform list and then a configuration step is performed in order to configure the model to interface with the historical database. When the dataset was extracted, it is unknown whether the variables names are still valid. It is therefore necessary to read and write the various variables to the database to determine if they are in fact valid. Further, the predicted output values, which may not have been a part of the historical database, need to be verified. Once these are verified, then the on-line model can be created to generate the predicted value for transfer to the control system. During this period of time, the control system must be disabled.

20 Claims, 27 Drawing Sheets

U.S. PATENT DOCUMENTS

| | | | | |
|---|---|---|---|---|
| 5,121,467 | * | 6/1992 | Skeirik | 706/906 |
| 5,150,313 | | 9/1992 | van den Engh et al. | 702/79 |
| 5,353,207 | * | 10/1994 | Keeler et al. | 706/23 |
| 5,444,820 | * | 8/1995 | Tzes et al. | 706/21 |
| 5,461,699 | * | 10/1995 | Arababi et al. | 706/21 |
| 5,581,459 | * | 12/1996 | Enbutsu et al. | 706/906 |
| 5,613,041 | * | 3/1997 | Keeler et al. | 706/17 |
| 5,704,011 | * | 12/1997 | Hensen et al. | 706/906 |
| 5,720,003 | * | 2/1998 | Chiang et al. | 706/21 |
| 6,002,839 | * | 12/1999 | Keeler et al. | 706/23 |

OTHER PUBLICATIONS

Neural Network Architecture for Adaptive System Modeling and Control by Esther Levin, Raanan Gewirtzman and Gideon F. Inbar, *Neural Networks*, pp. 185–191, 1991.

"Towards Practical Control Design Using Neural Computation" by T. Troudet, S. Garg, D. Mattern and W. Merrill, *ICJNN–91–Seattle—International Joint Conference on Neural Networks*, vol. 2, pp. 675–681, Jul. 8, 1991.

"Pulse–Processing Neural Net Hardware with Selectable Topology and Adaptive Weights and Delays" by J. R. Beerhold, M. Jansen and R. Eckmiller, *IJCNN International Joint Conference on Neural Networks*, vol. 2, pp. 569–574, Jun. 17, 1990.

"Learning the Time–Delay Characteristics in a Neural Network" by P. W. Rander and K. P. Unnikrishnan, *ICASSP–92—IEEE International Conference on Acoustics, Speech and Signal Processing*, vol. 2, pp. 285–288, Mar. 23, 1992.

Rumelhart et al, "Learning Internal Representations by Error Propagation", Parallel Distributed Processing, vol. 1, 1986.*

Haffner et al, "Integrating Time Alignment and Neural Networks for High Performance Continuous Speech Recognition", IEEE ICASSP, pp. 105–108, May 1991.*

Shashi Phoha, "Using the National Information Infrastructure (NII) for Monitoring, Diagnostics and Prognostics of Operating Machinery", Dec. 1996.*

IEEE Proceedings of the 35th Conference on Decision and Control.*

W. H. Press, "Numerical Recipes", Cambridge University Press (1986), pp. 77–101, 1986.*

Hartman et al, "Predicting the Future: Advantages of Semilocal Units", Neural Computing 3, pp.556–578, 1991.*

Lapedes et al, "How Neural Nets Work", American Insititute of Physics, pp. 442–456, 1988.*

Weigend et al, "Predicting the Future: A Connectionist Approach", Stanford–PDP–90–01/PARCSSL–90–20, Apr. 1990.*

Dorronsoro et al, "Neural Fraud Detection in Credit Card Operations", IEEE Transactions on Neural Networks, Jul. 1997.*

Spenceley et al, "The Intelligent Interface for Online Electronic Medical Records Using Temporal Data Mining", IEEE Proceedings of the 30th Hawaii, Jan. 1998.*

International Conference on System Sciences.*

* cited by examiner

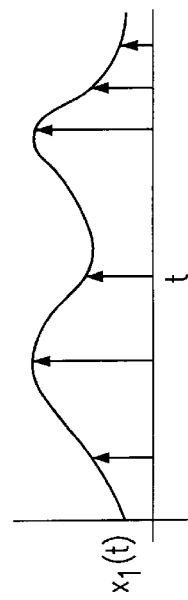
FIG. 3
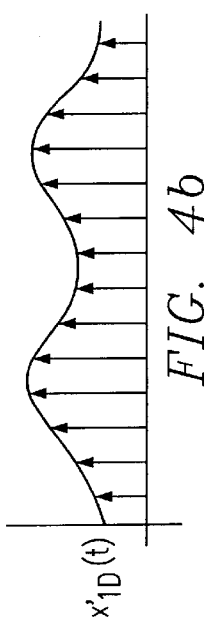
FIG. 4a
FIG. 4b
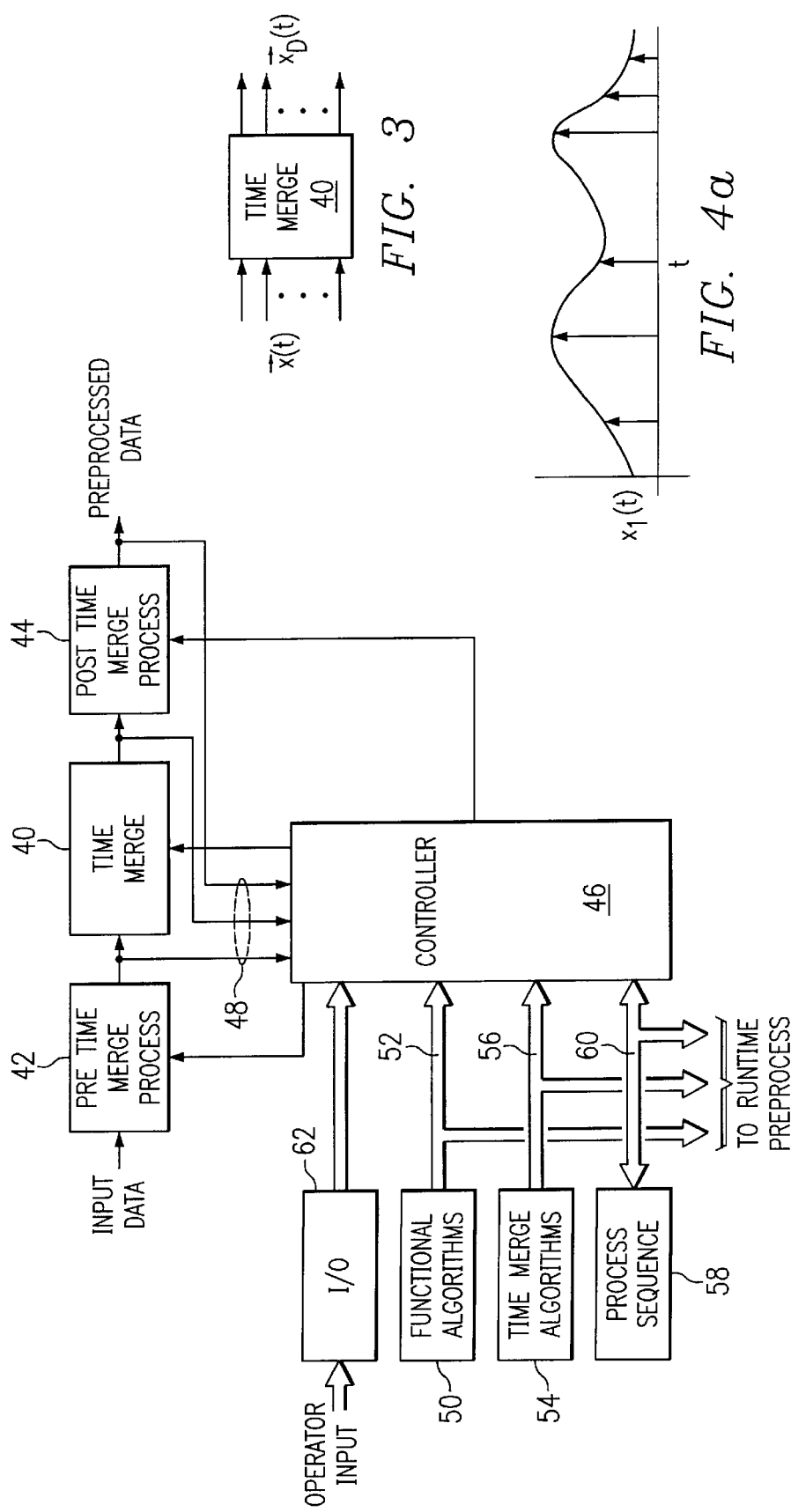
FIG. 2

FIG. 28

Online VOA Wizard : Map Dataset Variables to Input Tags   (step 2 of 6)

Below are your OnLine Dataset's Input Variables to Input Tag mappings that you previously defined in Process Insights.

|   | Dataset Variable | Input Tag |
|---|---|---|
| 1 | DateTime | DateTime |
| 2 | Pav_flow1 | Pav_flow1 |
| 3 | Pav_flow2 | Pav_flow2 |
| 4 | Pav_level1 | Pav_level1 |
| 5 | | |
| 6 | | |
| 7 | | |
| 8 | | |
| 9 | | |

[Edit...]

To correct a Dataset Variable-Input Tag pair, press "Edit..." to bring up the mapping editor. If you are satisfied with the pairs, press "Next" to continue.

[<Back]  [Next>]  [Cancel]

FIG. 29

Online VOA Wizard : Input Tag Read Test   (step 3 of 6)

The Wizard's automated "Read Test" has been successful, reading all of the Input Tags in the project from the PI Historian. The table below shows the actual tag values read from PI, as well as the status of each Input Tag.

|   | Variable | Input Tag | Value | Status |
|---|---|---|---|---|
| 1 | Pav_flow1 | Pav_flow1 | 88.9000 | GOOD |
| 2 | Pav_flow2 | Pav_flow2 | 445.7800 | GOOD |
| 3 | Pav_level1 | Pav_level1 | 456.1800 | GOOD |
| 4 | | | | |
| 5 | | | | |
| 6 | | | | |
| 7 | | | | |
| 8 | | | | |

Please press "Next" to continue.

[<Back]  [Next>]  [Cancel]

FIG. 30

| | Online VOA Wizard : Map Dataset Variables to Output Tags (step 4 of 6) |
|---|---|

Below are your OnLine Dataset's Variables to Output Tag mappings that were assigned as defaults in Process Insights.

| | Dataset Variable | Output Tag |
|---|---|---|
| 1 | Pav_ppma_0_P_1 | Pav_ppma_0_P_1 |
| 2 | | |
| 3 | | |
| 4 | | |
| 5 | | |
| 6 | | |
| 7 | | |
| 8 | | |
| 9 | | |

[Edit...]

To correct a Dataset Variable-Output Tag pair, press "Edit..." to bring up the mapping editor. If you are satisfied with the pairs after assigning the Output Tags, press "Next" to continue.

[<Back] [Next>] [Cancel]

FIG. 31

| Online VOA Wizard : Output Tag Read/Write Test (step 5 of 6) |
|---|

Excellent! The project Output Tags have been successfully read from and written to the PI Historian. The table has been updated with the new "Write Test" values and statuses.

| | Variable | Output Tag | Value | Status |
|---|---|---|---|---|
| 1 | Pav_ppma_0_P | Pav_ppma | 397.9128 | GOOD |
| 2 | | | | |
| 3 | | | | |
| 4 | | | | |
| 5 | | | | |
| 6 | | | | |
| 7 | | | | |
| 8 | | | | |

390 — [Write Test]    [Read Test] — 392

Please press "Next" to continue.

[<Back] [Next>] [Cancel]

AUTOMATED METHOD FOR BUILDING A MODEL

This application is a continuation-in-part of application Ser. No. 08/915,850, filed Aug. 21, 1997, U.S. Pat. No. 6,002,839, which is a continuation of application Ser. No. 08/576,581, filed Dec. 22, 1995, now abandoned, which is a continuation of application Ser. No. 08/008,218, filed Jan. 25, 1993, U.S. Pat. No. 5,479,573, which is a continuation-in-part of application Ser. No. 07/980,664, filed Nov. 24, 1992, now abandoned.

BACKGROUND OF THE INVENTION

A common problem that is encountered in training neural networks for prediction, forecasting, pattern recognition, sensor validation and/or processing problems is that some of the training/testing patterns might be missing, corrupted, and/or incomplete. Prior systems merely discarded data with the result that some areas of the input space may not have been covered during training of the neural network. For example, if the network is utilized to learn the behavior of a chemical plant as a function of the historical sensor and control settings, these sensor readings are typically sampled electronically, entered by hand from gauge readings and/or entered by hand from laboratory results. It is a common occurrence that some or all of these readings may be missing at a given time. It is also common that the various values may be sampled on different time intervals. Additionally, any one value may be "bad" in the sense that after the value is entered, it may be determined by some method that a data item was, in fact, incorrect. Hence, if the data were plotted in a table, the result would be a partially filled-in table with intermittent missing data or "holes", these being reminiscent of the holes in Swiss cheese. These "holes" correspond to "bad" or "missing" data. The "Swiss-cheese" data table described above occurs quite often in real-world problems.

Conventional neural network training and testing methods require complete patterns such that they are required to discard patterns with missing or bad data. The deletion of the bad data in this manner is an inefficient method for training a neural network. For example, suppose that a neural network has ten inputs and ten outputs, and also suppose that one of the inputs or outputs happens to be missing at the desired time for fifty percent or more of the training patterns. Conventional methods would discard these patterns, leading to training for those patterns during the training mode and no reliable predicted output during the run mode. This is inefficient, considering that for this case more than ninety percent of the information is still there for the patterns that conventional methods would discard. The predicted output corresponding to those certain areas will be somewhat ambiguous and erroneous. In some situations, there may be as much as a 50% reduction in the overall data after screening bad or missing data. Additionally, experimental results have shown that neural network testing performance generally increases with more training data, such that throwing away bad or incomplete data decreases the overall performance of the neural network.

In addition to the above, when data is retrieved on different time scales, it is necessary to place all of the data on a common time scale. However, this is difficult in that for a given time scale, another and longer time scale results in missing data at that position. For example, if one set of data were taken on an hourly basis and another set of data were taken on a quarter hour basis, there would be three areas of missing data if the input time scale is fifteen minutes. This data must be filled in to assure that all data is presented at synchronized times to the system model. Worse yet, the data sample periods may be non-periodic, producing totally asynchronous data.

In addition, this data may be taken on different machines in different locations with different operating systems and quite different data formats. It is essential to be able to read all of these different data formats, keeping track of the data value and the time-stamp of the data out to one or more "flat files" which are column oriented, each column corresponding to a data variable and/or the data/time stamp of the variable. It is a formidable task to retrieve this data keeping track of the date-time information and read it into an internal data-table (spreadsheet) so that the data can be time merged.

Another aspect of data integrity is that with respect to inherent delays in a system. For example, in a chemical processing system, a flow meter output can provide data at time $t_0$ at a given value. However, a given change in flow resulting in a different reading on the flow meter may not affect the output for a predetermined delay $\tau$. In order to predict what the output would be, this flow meter output must be input to the network at a delay equal to $\tau$. This must also be accounted for in the training of the network. In generating data that accounts for time delays, it has been postulated that it would be possible to generate a table of data that comprises both original data and delayed data. This necessitates a significant amount of storage in order to store all of the delayed data and all of the original data, wherein only the delayed data is utilized. Further, in order to change the value of the delay, an entirely new set of input data must be generated off the original set.

SUMMARY OF THE INVENTION

The present invention disclosed and claimed herein comprises a method for creating a representation of a plant and incorporating it into a run time prediction system for generating predicted output values representing the operating parameters of the plant during operation thereof. A historical database is provided representing the operation of the plant and comprised of data associated with plant inputs and plant Data is extracted from the historical database and then a dataset of variables corresponding to the inputs and outputs from the historical database is created. An off-line predictive model of the plant is then created utilizing the created dataset to predict a plant output, the off-line model defined by off-line model parameters. An on-line model is then created for generating predicted output values in real time during the operation the a plant and defined by on-line model parameters. The on-line model parameters are then replaced with the off-line model parameters after generation thereof.

In another aspect of the present invention, a graphical interface is provided a user to assist the user in performing the steps. Each step is facilitated with an interactive graphical interface with specific instructions and data input inquiries for the associated step to assist the user at that particular step.

In yet another aspect of the present invention, a method for determining an output value having a known relationship to an input value with a predicted value is provided. The method includes training a predictive model with a set of known outputs for a given set of inputs that exist in a finite dataset. This is followed by the step of inputting data to the predictive model that is within the set of given inputs. Then an output is predicted from the predictive model that corresponds to the given input such that a predicted output value will be obtained which will have associated therewith the errors of the predictive model.

BRIEF DESCRIPTION OF THE DRAWINGS

For a more complete understanding of the present invention and the advantages thereof, reference is now made to the following description taken in conjunction with the accompanying Drawings in which:

FIG. 1b illustrates a simplified block diagram of the system of FIG. 1a;

FIG. 2 illustrates a detailed block diagram of the preprocessor in the training mode;

FIG. 3 illustrates a simplified block diagram of the time merging operation, which is part of the preprocessing operation;

FIGS. 4a and 4b illustrate data blocks of the before and after time merging operation;

FIGS. 26, 27, 28, 29, 30, 31, 32 and 33 illustrate screen shots for a data wizard for the on-line analyzer operation;

DETAILED DESCRIPTION OF THE INVENTION

Figure 1A:
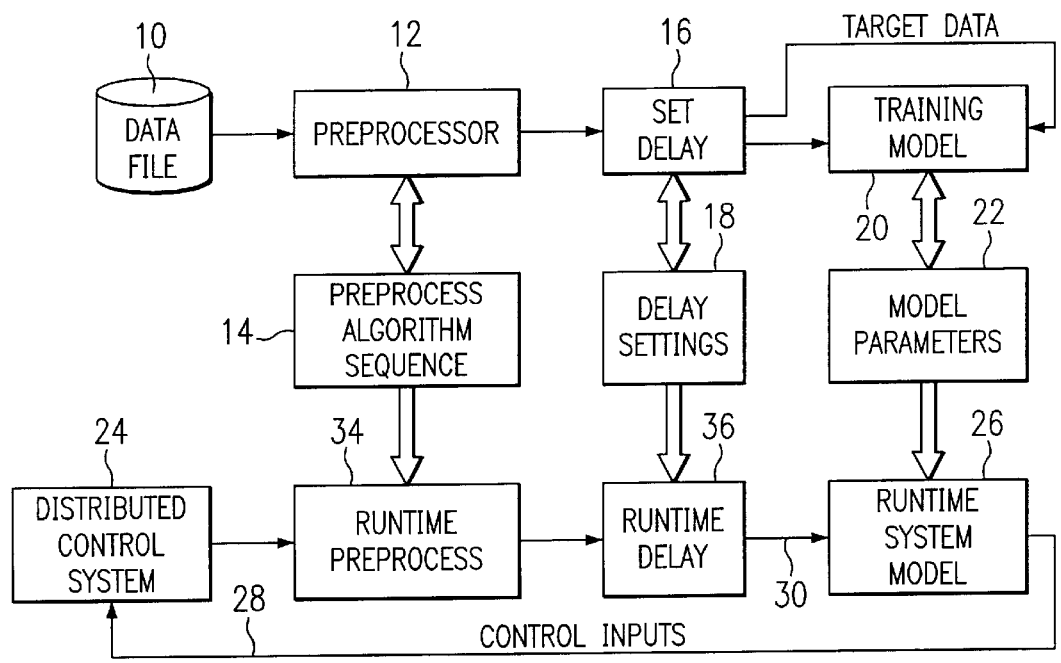
FIG. 1a illustrates an overall block diagram of the system for both preprocessing data during the training mode and for preprocessing data during the run mode.

Referring now to FIG. 1a, there is illustrated an overall block diagram of the data preprocessing operation in both the training mode and the run-time mode. In the training mode, one of more data files 10 are provided, which data files include both input training data and output training data. The training data is arranged in "sets", which sets correspond to different plant variables, and which may be sampled at different time intervals. This data is referred to as the "raw" data. When the data is initially presented to an operator, the data is typically unformatted, i.e., each set of data is in the form that it was originally received. Although not shown, the operator will first format the data files so that all of the data files can be merged into a data-table or spreadsheet, keeping track of the original "raw" time information. This is done in such a manner as to keep track of the time stamp for each variable. Thus, the "raw" data is organized as time, value pairs of columns; that is, for each variable $x_i$, there is its associated time of sample $t_i$. The data can then be grouped into sets $\{x_i, t_i\}$.

If any of the time-vectors happen to be identical, it is convenient to arrange the data such that the data will be grouped in common time scale groups, and data that is on, for example, a fifteen minute sample time scale will be grouped together and data sampled on a one hour sample time scale will be grouped together. However, any type of format that provides viewing of multiple sets of data is acceptable.

The data is input to a preprocessor 12 that functions to perform various preprocessing functions, such as reading bad data, reconciling data to fill in bad or missing data, and performing various algorithmic or logic functions on the data. Additionally, the preprocessor 12 is operable to perform a time merging operation, as will be described hereinbelow. During operation, the preprocessor 12 is operable to store various preprocessing algorithms in a given sequence in a storage area 14. As will be described hereinbelow, the sequence defines the way in which the data is manipulated in order to provide the overall preprocessing operation.

After preprocessing by the preprocessor 12, the preprocessed data is input to a delay block 16, the delay block 16 operable to set the various delays for different sets of data. This operation can be performed on both the target output data and the input training data. The delay settings are stored in a storage area 18 after determination thereof.

The output of the delay block 16 is input to a training model 20. The training model 20 is a non-linear model that receives input data and compares it with target output data and trains the network to generate a model for predicting the target output data from the input data. In the preferred embodiment, the training model utilizes a multi-layered neural network that is trained on one of multiple methods, one being Back Propagation. Various weights within the network are set during the Back Propagation training operation, and these are stored as model parameters in a storage area 22. The training operation and the neural network are conventional systems.

A Distributed Control System (DCS) 24 is provided that is operable to generate various system measurements and control settings representing system variables such as temperature, flow rates, etc., that comprise the input data to a system model. The system model can either generate control inputs for control of the DCS 24 or it can provide a predicted output, these being conventional operations. This is provided by a run-time system model 26, which has an output 28 and an input 30. The input 30 is comprised of the preprocessed and delayed data and the output can either be a predictive output, or a control input to the DCS 24. In the embodiment of FIG. 1, this is illustrated as control inputs to the DCS 24. The run-time system model 26 is utilizing the model parameters stored in the storage area 22. It should be noted that the run-time system model 26 contains a representation learned during the training operation, which representation was learned on the preprocessed data. Therefore, data generated by the DCS 24 must be preprocessed in order to correlate with the representation stored in the run-time system model 26.

The DCS 24 has the data output thereof input to a run-time preprocess block 34, which is operable to process the data in accordance with the sequence of preprocessing algorithms stored in the storage area 14, which were generated during the training operation. The output of the run-time preprocessor 34 is input to a run-time delay box 36 to set delays on the data in accordance with the delay settings stored in the storage area 18. This provides the overall preprocessed data output on the line 34 input to the run-time system model 26.

Figure 1B:
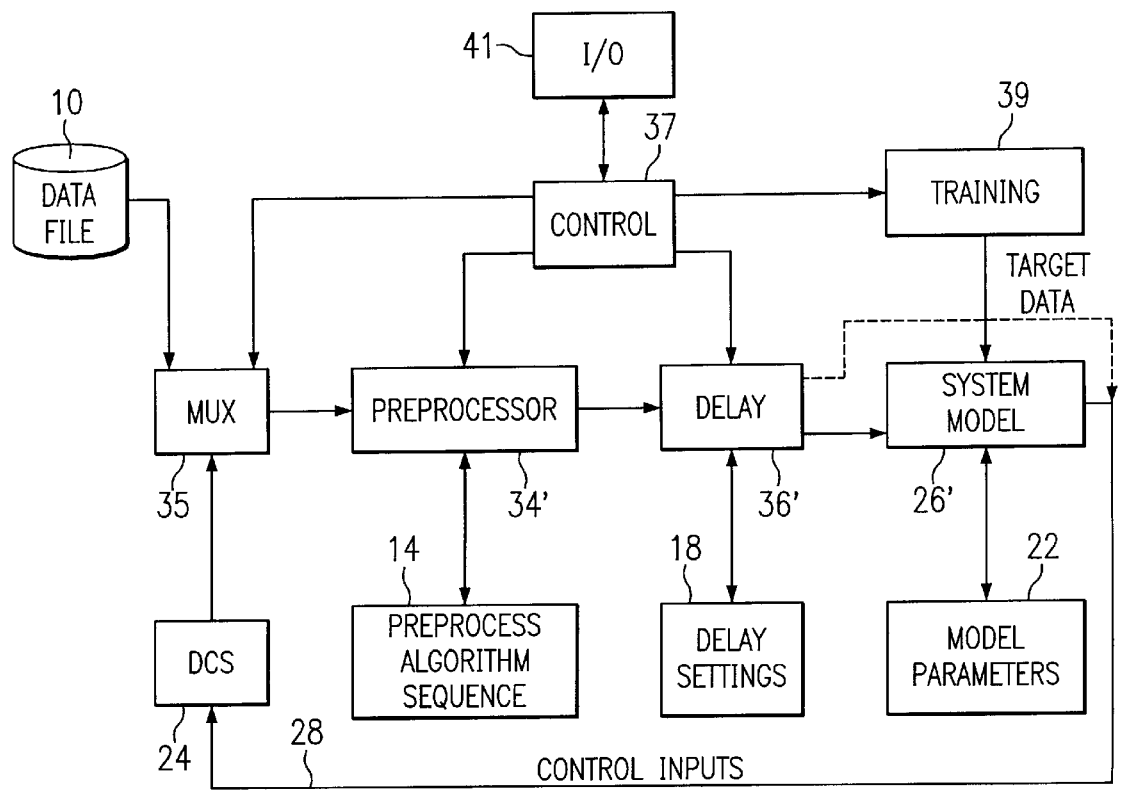

Referring now to FIG. 1b, there is illustrated a simplified block diagram of the system of FIG. 1a, wherein a single preprocessor 34' and a single delay 36' are utilized. The output of the delay 36' is input to a single system model 26'. In operation, the preprocessor 34', the delay 36' and the system model 26' operate in both a training mode and a run-time mode. A multiplexer 35 is provided that receives the output from the data file(s) 10 and the output of the DCS 24, this providing plant variables of the DCS 24, the output of the multiplexer input to the preprocessor 34'. A control device 37 is provided that controls the multiplexer 35 to select either a training mode or a run-time mode. In the training mode, the data file(s) 10 has the output thereof selected by a multiplexer and the preprocessor 34' is operable to preprocess the data in accordance with a training mode, i.e., the preprocessor 34' is utilized to determine what the predetermined algorithm sequence is that is stored in the storage area 14. An input/output device I/O 41 is provided for allowing the operator to interface with the control device 37. The delay 36' is also controlled by the control device 37 to determine the delay settings for storage in the storage area 18. The system model 26' is operated in a training mode such that the target data and the input data to the system model 26' are generated, the training controlled by training block 39. The training block 39 is operable to select one of multiple training algorithms, such as back propagation, for training of the system model 26'. The model parameters are stored in the storage area 22.

After training, the control device 37 places the system in a run-time mode such that the preprocessor 34' is now operable to apply the algorithm sequence in the storage area 14 to the data selected by the multiplexer 35 from the DCS 24. After the algorithm sequence is applied, the data is output to the delay block 36', which introduces the various delays in the storage area 18, and then these are input to the system model 26' which then operates in a predictive mode to either predict an output or to predict control inputs for the DCS 24.

Referring now to FIG. 2, there is illustrated a more detailed block diagram of the preprocessor 12 utilized during the training mode. In general, there are three stages to the preprocessing operation. The central operation is a time merge operation, represented by block 40. However, prior to performing a time merge operation on the data, a pre-time merge process is performed, as indicated by block 42. After the time merge operation, the data is subjected to a post-time merge process, as indicated by block 44. The output of the post-time merge process block 44 provides the preprocessed data for input to the delay block 16.

A controller 46 is provided for controlling the process operation of the blocks 40–44, the outputs of which are input to the controller 46 on lines 48. The controller 46 is interfaced with a functional algorithm storage area 50 through a bus 52 and a time merge algorithm 54 through a bus 56. The functional algorithm storage area 50 is operable to store various functional algorithms that can be mathematical, logical, etc., as will be described hereinbelow. The time merge algorithm storage area 54 is operable to contain various time merge formats that can be utilized, such as extrapolation, interpolation or a boxcar method. A process sequence storage area 58 is provided that is operable to store the sequence of the various processes that are determined during the training mode, these interfaced with a bi-directional bus 60. During the training mode, the controller 46 determines which of the functional algorithms are to be applied to the data and which of the time merge algorithms are to be applied to the data in accordance with instructions received from an operator input through an input/output device 62. During the run-time mode, the process sequence in the storage area 58 is utilized to apply the various functional algorithms and time merge algorithms to input data.

Referring now to FIG. 3, there is illustrated a simplified block diagram of a time merge operation. All of the input data $x_D(t)$ is input to the time merge block 40 to provide time merge data $x_D'(t)$ on the output thereof. Although not shown, the output target data y(t) is also processed through the time merge block 40 to generate time merged output data y'(t).

Referring now to FIGS. 4a and 4b, there are illustrated data blocks of one input data set $x_1(t)$ and the resulting time merged output $x_1'(t)$. It can be seen that the waveform associated with $x_1(t)$ has only a certain number, n, of sample points associated therewith. The time-merge operation is a transform that takes one or more columns of data, $x_i(t_i)$, such as that shown in FIG. 4a, with $n_i$ time samples at times $t_i'$. That is, the time-merge operation is a function, $\Omega$, that produces a new set of data {x'} on a new time sale t' from the given set of data x(t) sampled at t.

$$\{\vec{x}';\ \vec{t}'\} = \Omega\{\vec{x},\ \vec{t}\} \qquad (1)$$

This function is done via a variety of conventional extrapolation, interpolation, or box-car algorithms and is represented as a C-language callable function as:

$$\text{eturn=time-merge}(\vec{x}_1, \vec{x}_2 \ldots \vec{x}_k, \vec{t}'_1 \ldots \vec{x}'_k, \vec{t}'_1) \quad (2)$$

where $x_i$, $t_i$ are vectors of the old values and old times; $x_i'$ ... $x_k'$ are vectors of the new values; and t' is the new time-scale vector.

Figure 5A:
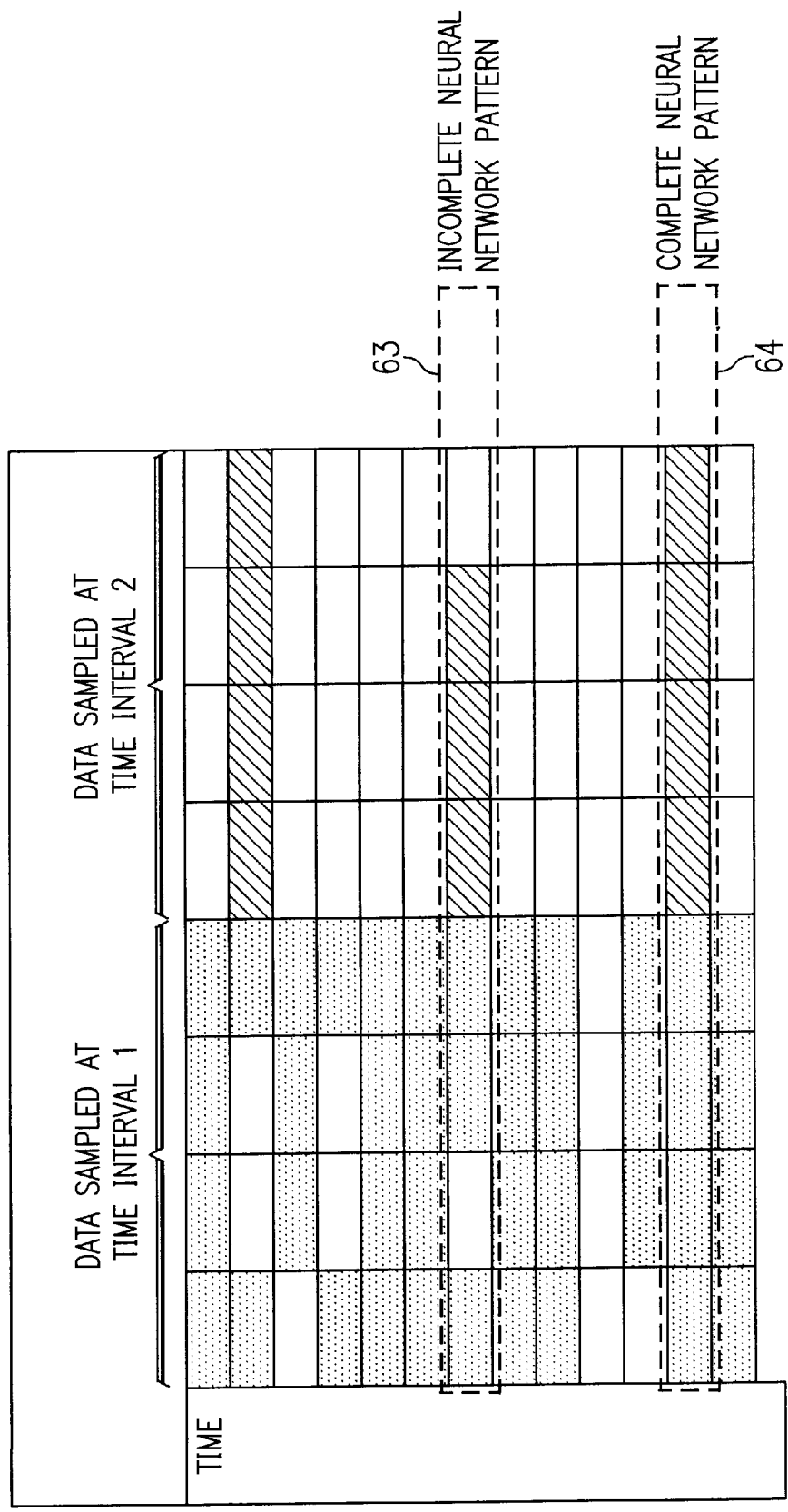
FIGS. 5a, 5b and 5c illustrate a diagrammatic view of the time merging operation.

Referring now to FIG. 5a, there is illustrated a data table with bad, missing, or incomplete data. The data table consists of data with time disposed along a vertical scale and the samples disposed along a horizontal scale. Each sample comprises many different pieces of data with two data intervals illustrated. It can be seen that when the data is examined for both the data sampled at the time interval "1" and the data sampled at the time interval "2", that some portions of the data result in incomplete patterns. This is illustrated by a dotted line 63, where it can be seen that some data is missing in the data sampled at time interval "1" and some is missing in time interval "2". A complete neural network pattern is illustrated box 64, where all the data is complete. Of interest is the time difference between the data sampled at time interval "1" and the data sampled at time interval "2". In time interval "1", the data is essentially present for all steps in time, whereas data sampled at time interval "2" is only sampled periodically relative to data sampled at time interval "1". As such, a data reconciliation procedure is implemented that fills in the missing data and also reconciles between the time samples in time interval "2" such that the data is complete for all time samples for both time interval "1" and time interval "2".

The neural network models that are utilized for time-series prediction and control require that the time-interval between successive training patterns be constant. Since the data that comes in from real-world systems is not always on the same time scale, it is desirable to time-merge the data before it can be used for training or running the neural network model. To achieve this time-merge operation, it may be necessary to extrapolate, interpolate, average or compress the data in each column over each time-region so as to give an input value x'(t) that is on the appropriate time-scale. All of these are referred to as "data reconciliation". The reconciliation algorithm utilized may include linear estimates, spline-fit, boxcar algorithms, etc. If the data is sampled too frequently in the time-interval, it will be necessary to smooth or average the data to get a sample on the desired time scale. This can be done by window averaging techniques, sparse-sample techniques or spline techniques.

In general, x'(t) is a function of all of the raw values x(t) given at present and past times up to some maximum past time, Xmax. That is, $$_1(t_N), x_2(t_N), \ldots x_n(t_N); x_1(t_{N-1}), x_1(t_{N-2}) \ldots x_1(t_{N-1}); x_1(t_1), x_2(t_1) \ldots x_n(t_1)) \quad (3)$$

where some of the values of $x_i(t_j)$ may be missing or bad.

This method of finding x'(t) using past values is strictly extrapolation. Since the system only has past values available during run-time mode, the values must be reconciled. The simplest method of doing this is to take the next extrapolated value $x'_i(t) = x_i(t_N)$; that is, take the last value that was reported. More elaborate extrapolation algorithms may use past values $x_i(t-\tau_{ij})$, j∈(o, ... i$_{max}$). For example, linear extrapolation would use:

$$) = x_i(t_{N-1}) + \left[\frac{x_i(t_N) - x_i(t_{N-1})}{t_N - t_{N-1}}\right] t; \ t > \quad (4)$$

Polynomial, spline-fit or neural-network extrapolation techniques use Equation 3. (See e.g. W. H. Press, "Numerical Recipes", Cambridge University Press (1986), pp. 77–101) Training of the neural net would actually use interpolated values, i.e., Equation 4, wherein the case of interpolation $t_N > t$.

Figure 5B:
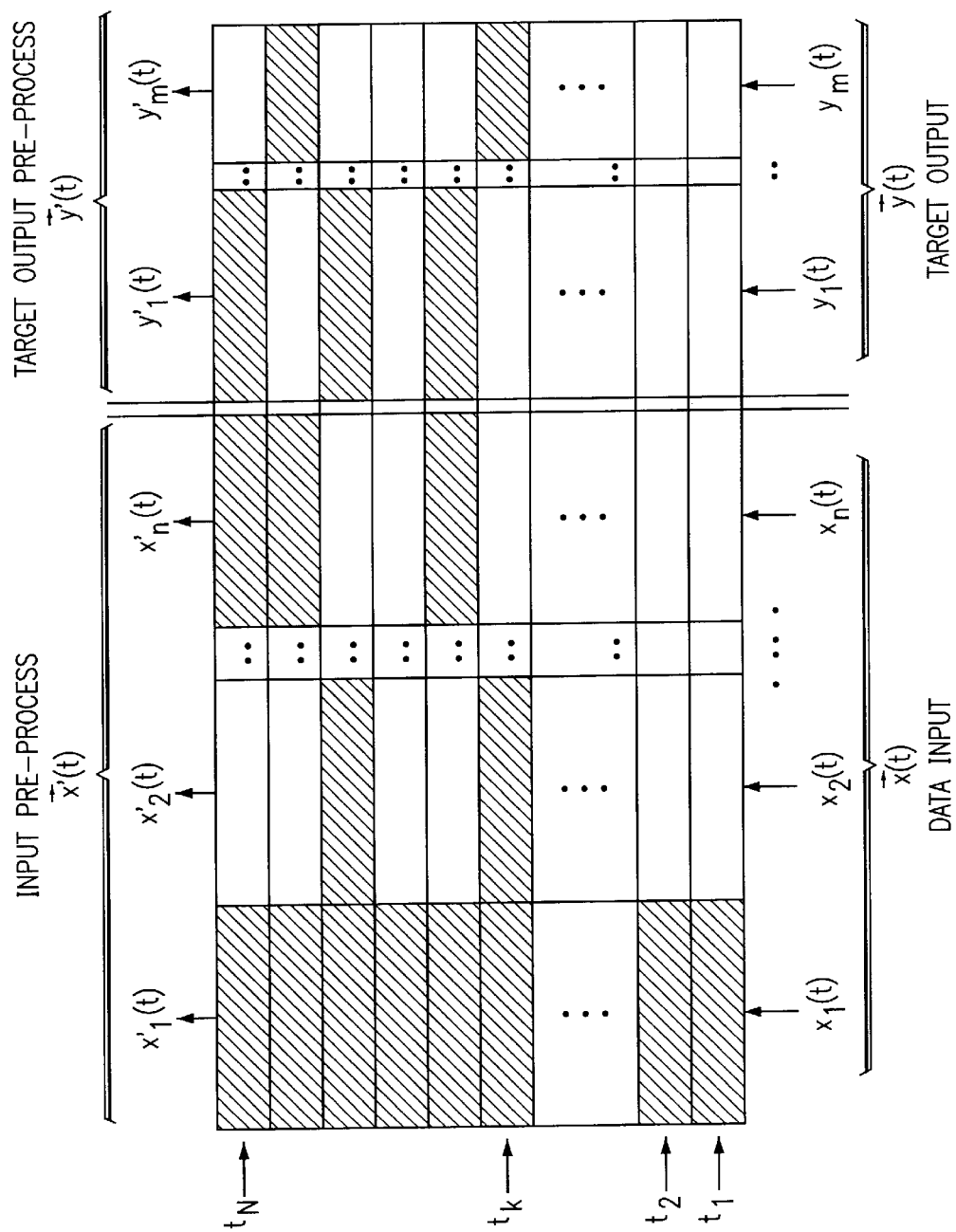

Referring now to FIG. 5b, there is illustrated an input data pattern and target output data pattern illustrating the pre-process operation for both preprocessing input data to provide time merged output data and also pre-processing the target output data to provide pre-processed target output data for training purposes. The data input x(t) is comprised of a vector with many inputs, $x_1(t), x_2(t), \ldots x_n(t)$, each of which can be on a different time scale. It is desirable that the output x'(t) be extrapolated or interpolated to insure that all data is present on a single time scale. For example, if the data at $x_1(t)$ were on a time scale of one sample every second, a sample represented by the time $t_k$, and the output time scale were desired to be the same, this would require time merging the rest of the data to that time scale. It can be seen that the data $x_2(t)$ occurs approximately once every three seconds, it also being noted that this may be asynchronous data, although it is illustrated as being synchronized. The data buffer in FIG. 4b is illustrated in actual time. The reconciliation could be as simple as holding the last value of the input $x_2(t)$ until a new value is input thereto, and then discarding the old value. In this manner, an output will always exist. This would also be the case for missing data. However, a reconciliation routine as described above could also be utilized to insure that data is always on the output for each time slice of the vector x'(t). This also is the case with respect to the target output which is preprocessed to provide the preprocessed target output y'(t).

Figure 5C:
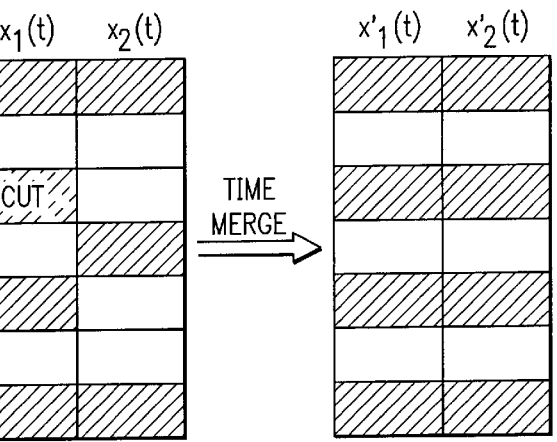

Referring now to FIG. 5c, there is illustrated the preferred embodiment of performing the time merge. Illustrated are two formatted tables, one for two sets of data $x_1(t)$ and $x_2(t)$. This is set up such that the data set for $x_1(t)$ is illustrated as being on one time scale and the data $x_2(t)$ is on a different time scale. Additionally, one value of the data set $x_1(t)$ is illustrated as being bad, which piece of bad data is "cut" from the data set, as will be described hereinbelow. The operation in the preprocessing mode fills in this bad data and then time merges it. In this example, the time scale for $x_1(t)$ is utilized as a time scale for the time merge data such that the time merge data $x_1'(t)$ is on the same time scale with the "cut" value filled in as a result of the preprocessing operation and the data set $x_2(t)$ is processed in accordance with one of the time merged algorithms to provide data for $x_2'(t)$ and on the same time scale as the data $x_1'(t)$. These algorithms will be described in more detail hereinbelow.

Figure 6:
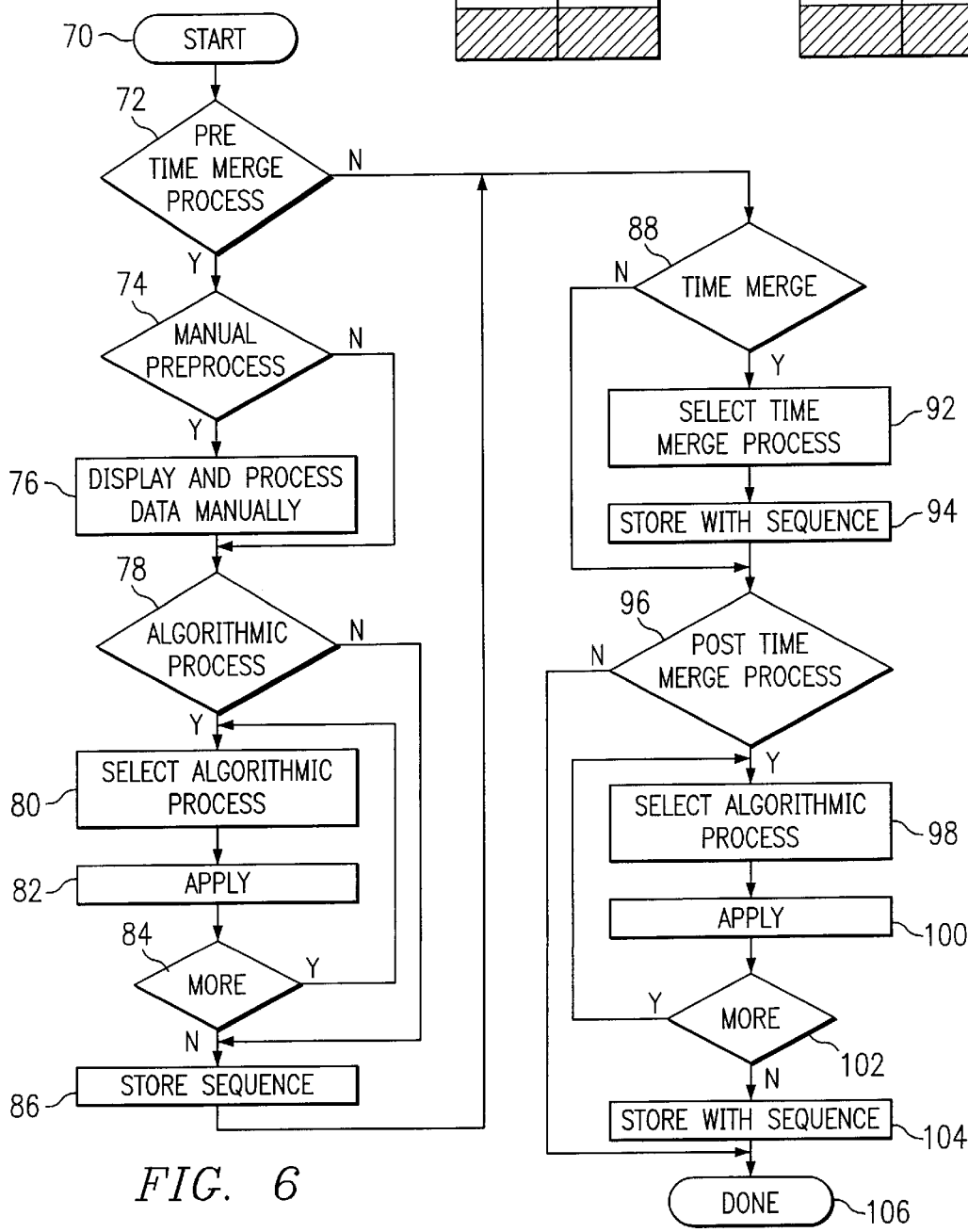
FIG. 6 illustrates a flowchart depicting the preprocessing operation.

Referring now to FIG. 6, there is illustrated a flowchart depicting the preprocessing operation. The flow chart is initiated at a start block 70 and then proceeds to a decision block 72 to determine if there are any pre-time merge process operations. If so, the program flows to a decision block 74 to determine whether there are any manual pre-process operations to be performed. If so, the program flows along the "Y" path to a function block 76 to manually preprocess the data. In manual preprocessing of data, the data is viewed in a desired format by the operator and the operator can look at the data and eliminate, "cut" or otherwise modify obviously bad data values. This is to be compared to the automatic operation wherein all values are subjected to a predetermined algorithm to process the data. For example, if the operator noticed that one data value is significantly out of range with the normal behavior of the remaining data, this data value can be "cut" such that it is no longer present in the data set and thereafter appears as missing data. However, an algorithm could be generated that either cuts out all data above a certain value or clips the values to a predetermined maximum. The clipping to a predetermined maximum is an algorithmic operation that is described hereinbelow.

After displaying and processing the data manually, the program flows to a decision block 78. Additionally, if the manual preprocess operation is not utilized, the program flows from the decision block 74 along the "N" path to the input of decision block 78. The decision block 78 is operable to determine whether an algorithmic process is to be applied to the data. If so, the program flows along a "Y" block to a function block 80 to select a particular algorithmic process for a given set of data. After selecting the algorithmic process, the program flows to a function block 82 to apply the algorithm process to the data and then to a decision block 84 to determine if more data is to be processed with the algorithmic process. Now the program flows back around to the input of the function block 80 along a "Y" path. Once all data has been subjected to the desired algorithmic processes, the program flows along a "N" path from decision block 84 to a function block 86 to store the sequence of algorithmic processes such that each data set has the desired algorithmic processes applied thereto in the sequence. Additionally, if the algorithmic process is not selected by the decision block 78, the program flows along an "N" path to the input of the function block 86.

After the sequence is stored in the function block 86, the program flows to a decision block 88 to determine if a time merge operation is to be performed. The program also flows along an "N" path from the decision block 72 to the input of decision block 88 if the pre-time-merge process is not required. The program flows from the decision block 88 along the "Y" path to a function block 92 if the time merge process has been selected, and then the time merge operation performed. The time merge process is then stored with the sequence as part thereof. The program then flows to the input of a decision block 96 to determine whether the post time merge process is to be performed. If the post time merge process is not performed, as determined by the decision block 88, the program flows along the "N" path therefrom to the decision block 96. If the post time merge process is to be performed, the program flows along the "Y" path from the decision block 96 to the input of a function block 98 to select the algorithmic process and then to a function block 100 to apply the algorithmic process to the desired set of data and then to a decision block 102 to determine whether additional sets of data are to be processed in accordance with the algorithmic process. If so, the program flows along the "Y" path back to the input of function block 98, and if not, the program flows along the "N" path to a function block 104 to store the new sequence of algorithmic processes with the sequence and then to a DONE block 106. If the post time merge process is not to be performed, the program flows from the decision block 96 along the "N" path to the input of the DONE block 106.

Figure 7A:
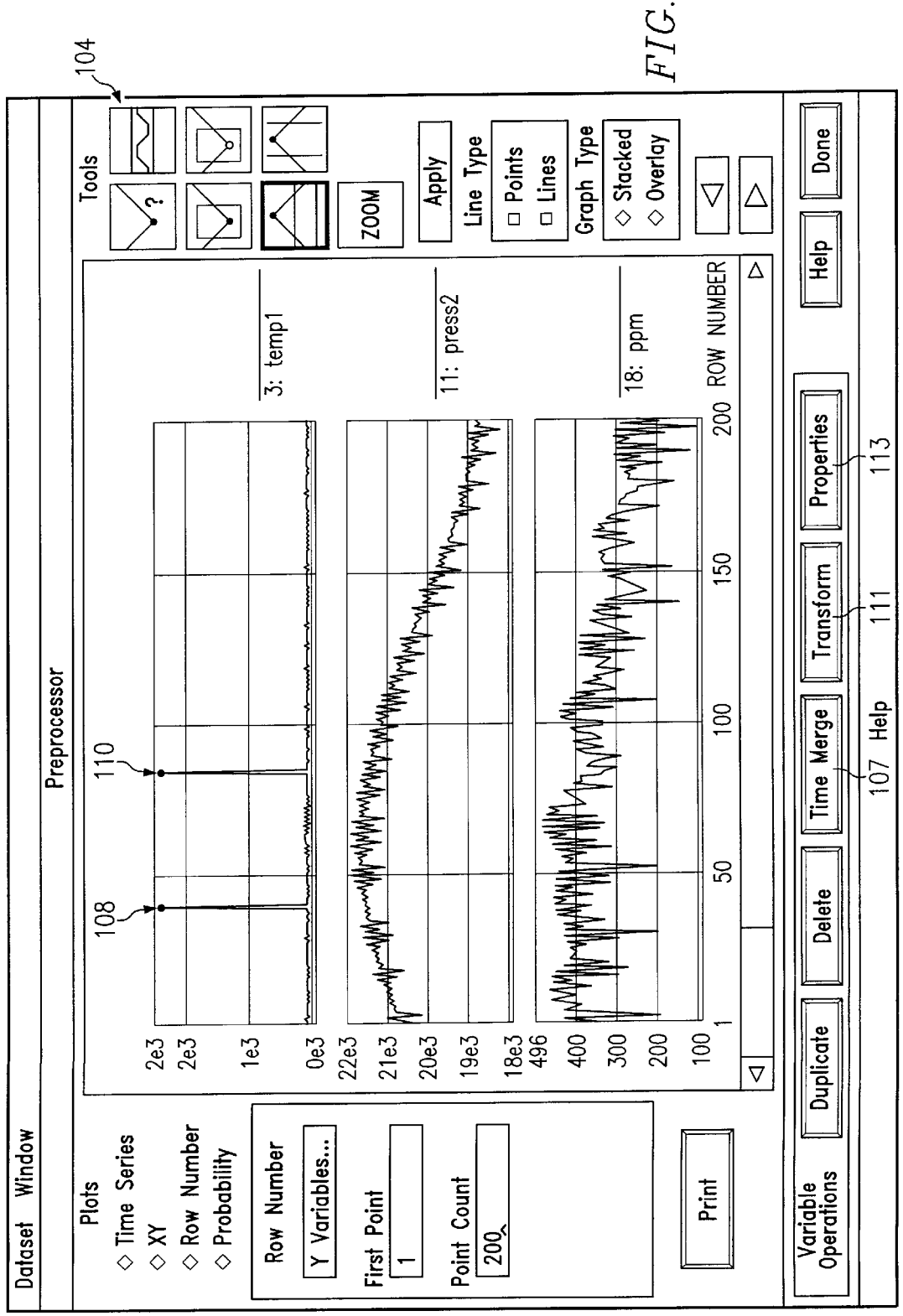
FIGS. 7a, 7b, 7c, 7d, 7e and 7f illustrate the use of graphical tools for cleaning up the "raw" data.
Figure 7B:
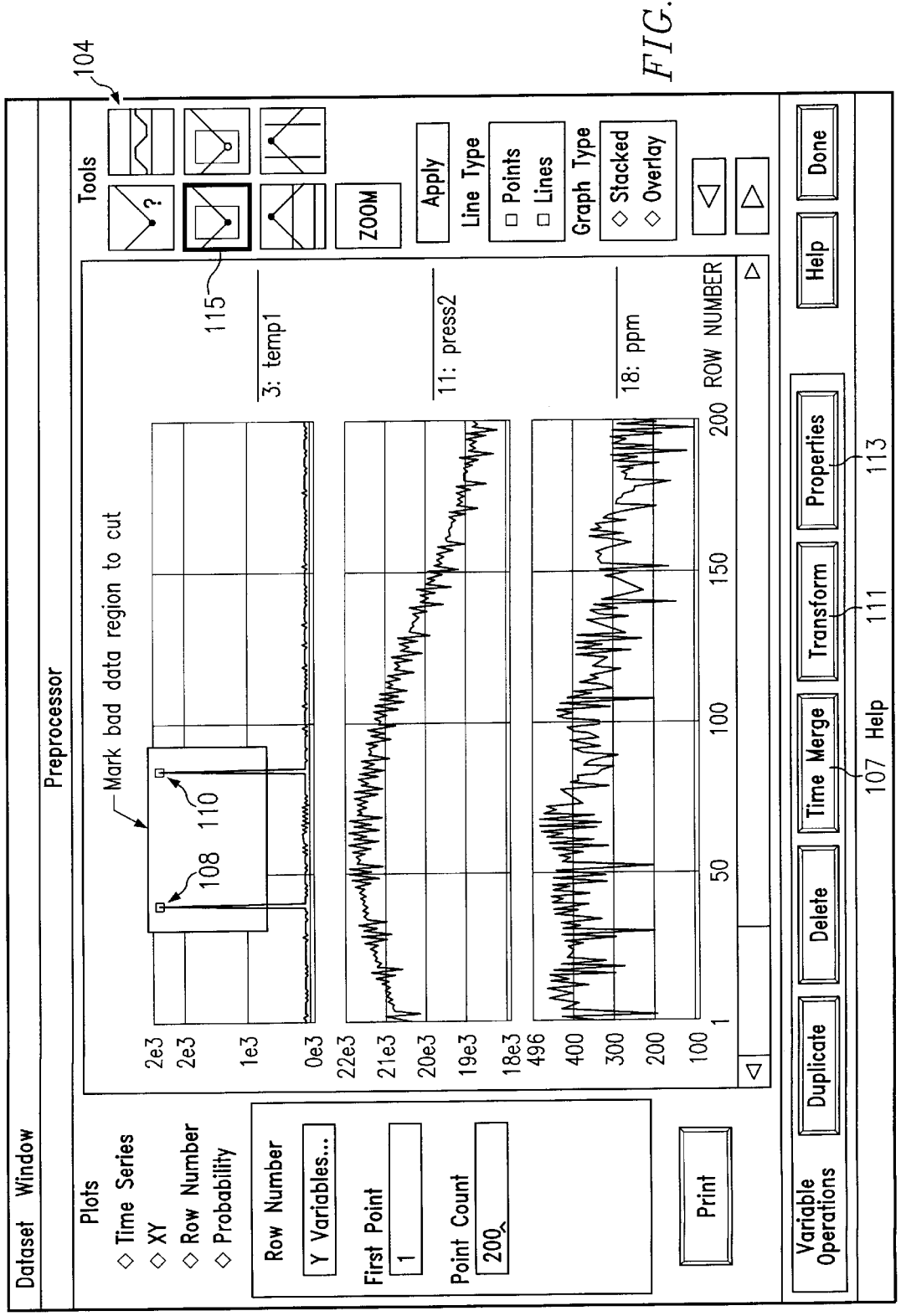
Figure 7C:
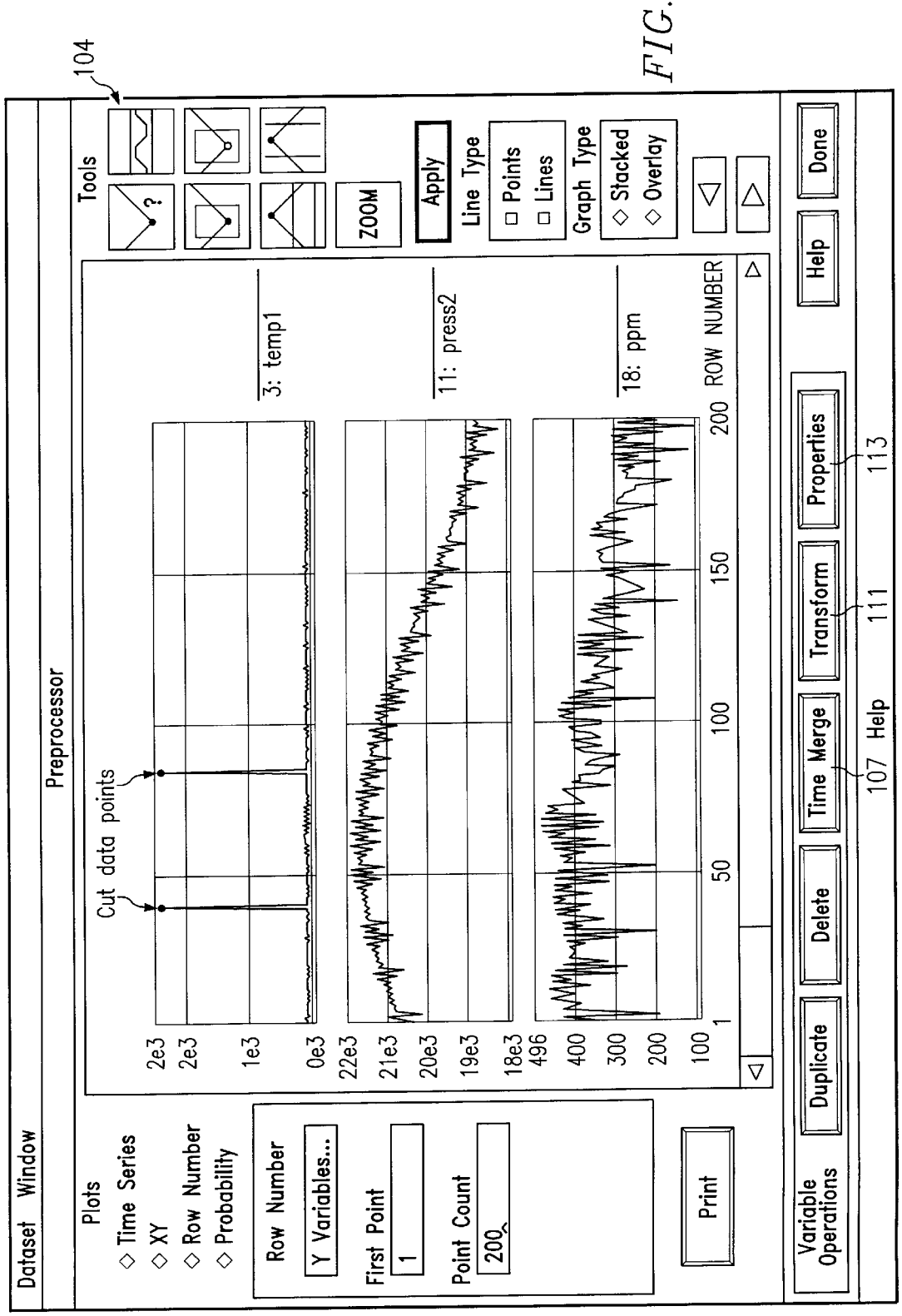
Figure 7D:
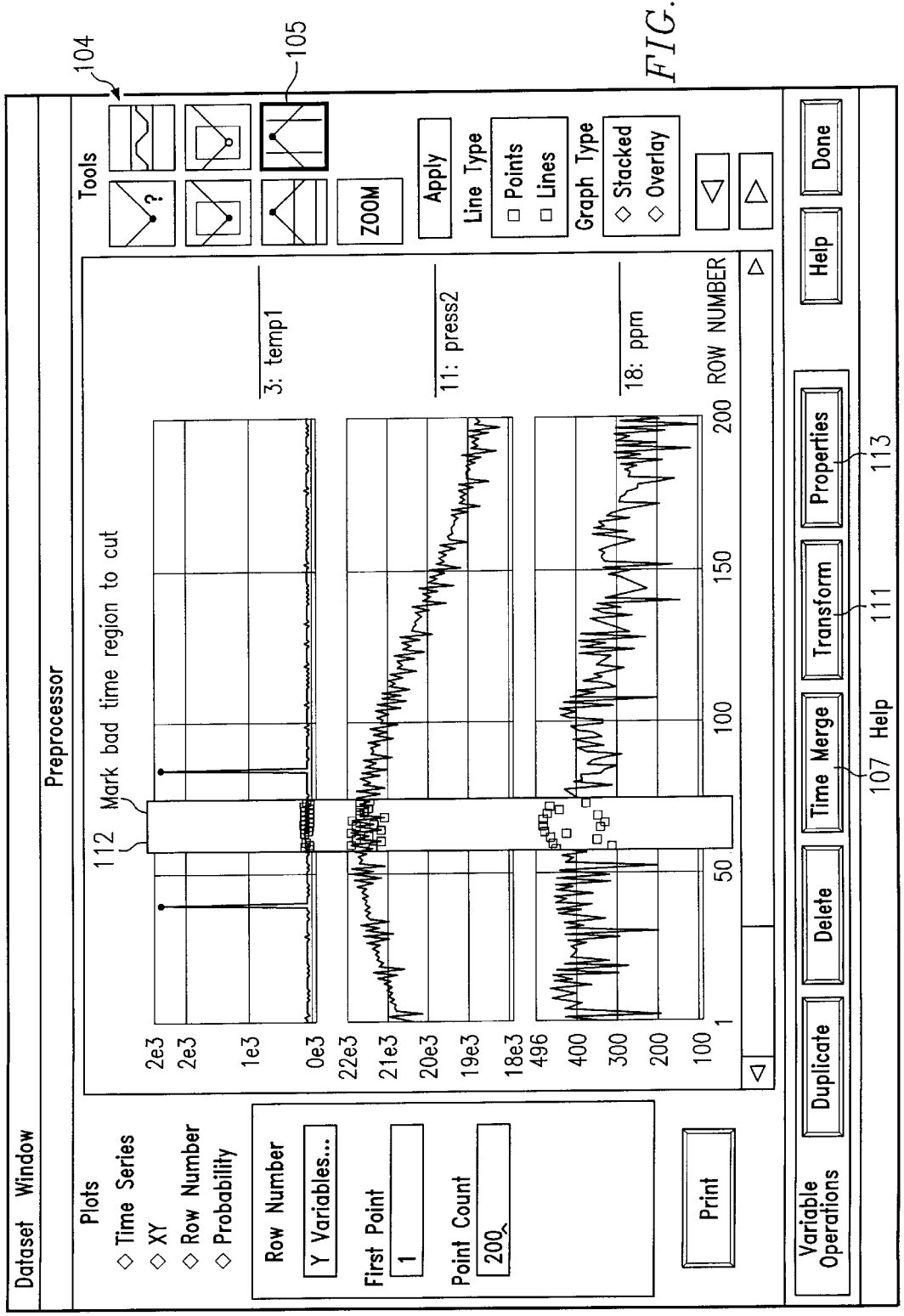
Figure 7E:
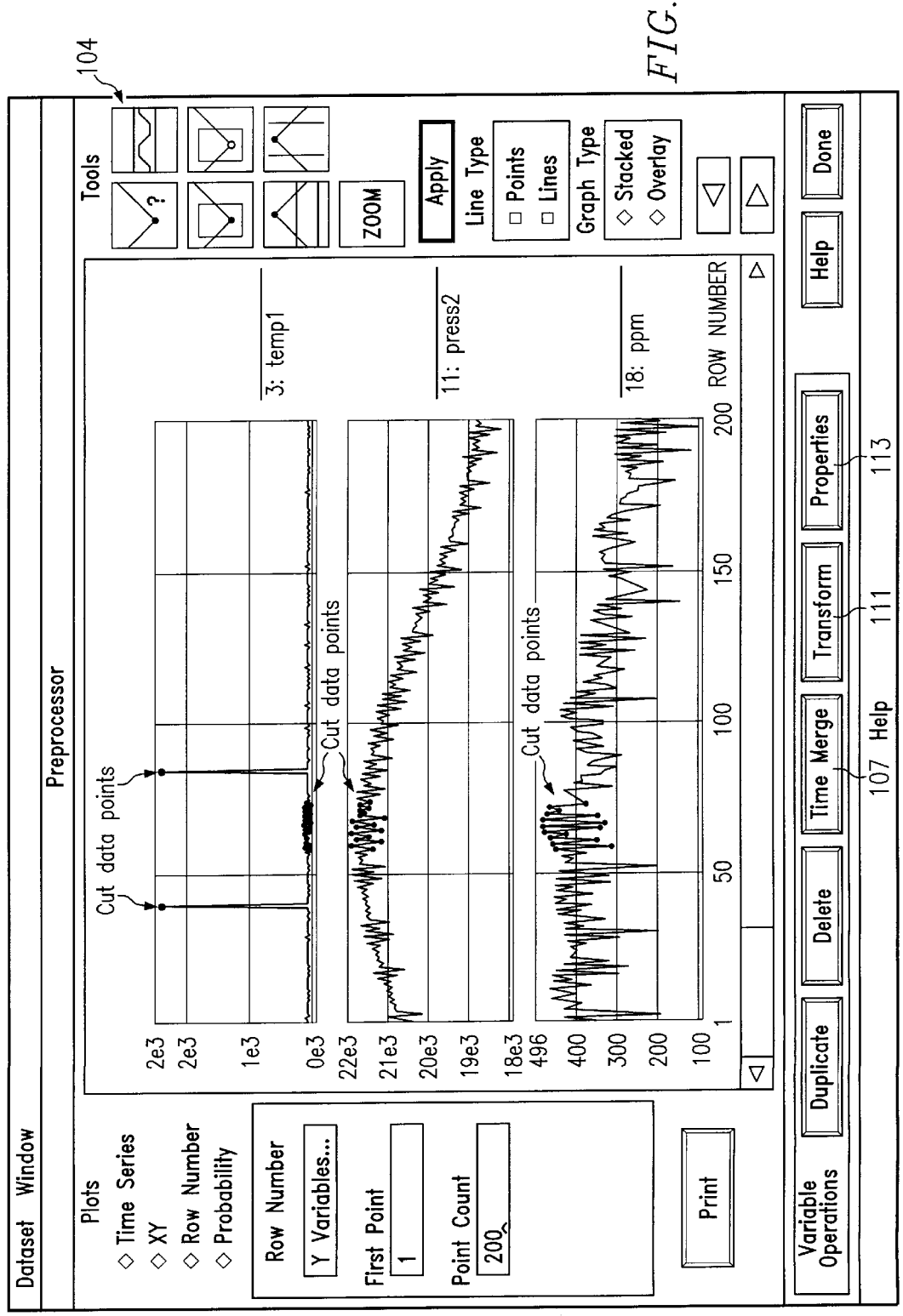
Figure 7F:
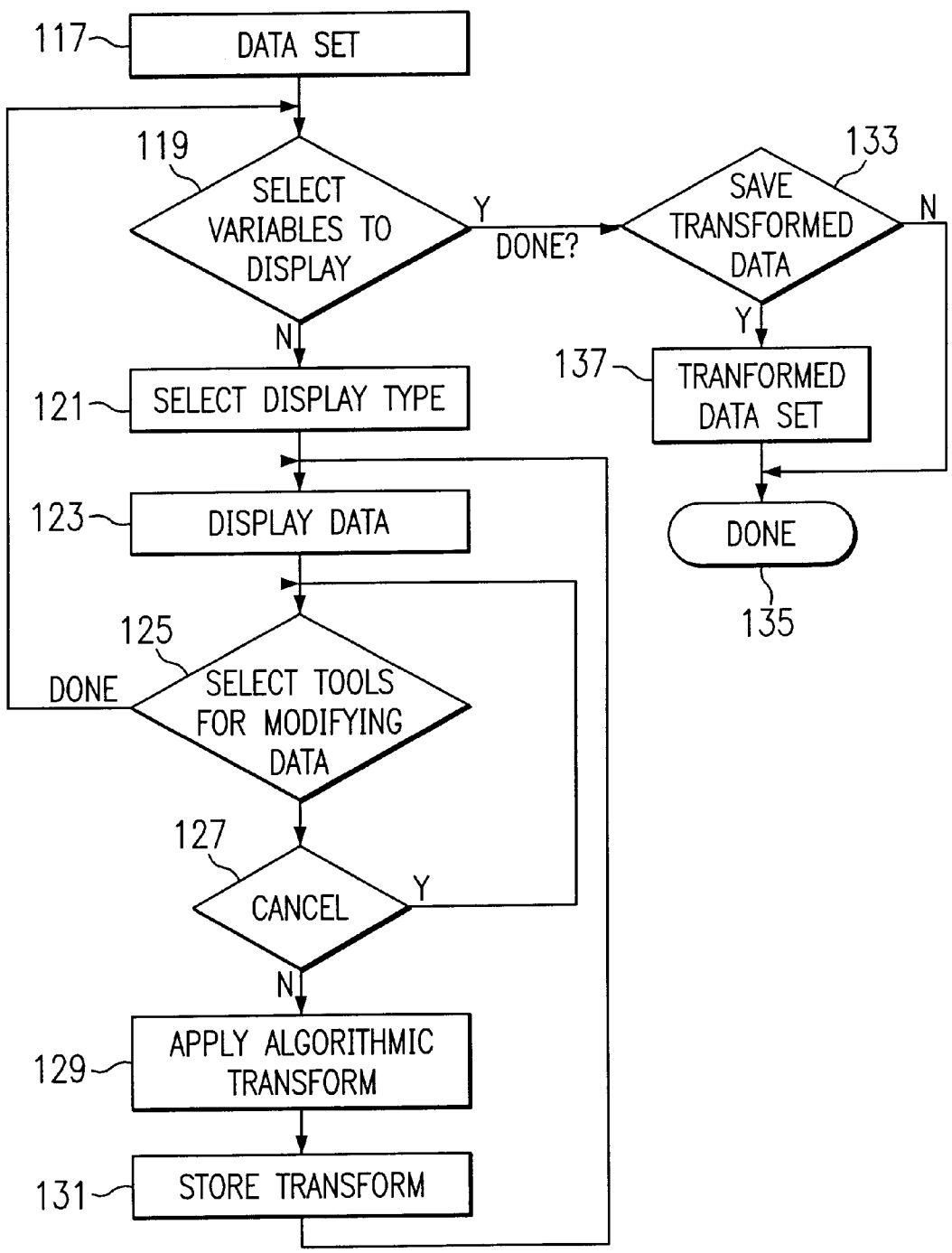

Referring now to FIGS. 7a–7f, there are illustrated three plots of data, one for an input "temp1", one for an input "press2" and one for an output "ppm". The first input relates to a temperature measurement, the second input relates to a pressure measurement and the output data corresponds to a parts per million variations. In the first data set, the tempi data, there are two points of data 108 and 110, which need to be "cut" from the data, as they are obviously bad data points. These will appear as cut data in the data-set which then must be filled in by the appropriate time merge operation utilizing extrapolation, interpolation, etc. techniques. FIG. 7a shows the raw data. FIG. 7b shows the use of the cut data region tool 115. FIG. 7b shows the points 108 and 110 highlighted by dots showing them as cut data points. On a color screen, these dotes appear as red. FIG. 7d shows a vertical cut of the data, cutting across several variables simultaneously. Applying this causes all of the data points to be marked as cut, as shown in FIG. 7e. FIG. 7f shows a flowchart of the steps involved in cutting or otherwise modifying the data. Additionally, a region of data could be selected, which is illustrated by a set of boundaries 112, which results are utilized to block out data. For example, if it were determined that data during a certain time period was invalid due to various reasons, this data could be removed from the data sets, with the subsequent preprocessing operable to fill in the "blocked" or "cut" data.

In the preferred embodiment, the data is displayed as illustrated in FIGS. 7a–7f, and the operator allowed to select various processing techniques to manipulate the data via various cutting, clipping and viewing tools 109, 111, 113, that allow the user to select data items to cut, clip, transform or otherwise modify. In one mode, the mode for removing data, this is referred to as a manual manipulation of the data. However, algorithms can be applied to the data to change the value of that data. Each time the data is changed, it is rearranged in the spreadsheet format of the data. As this operation is being performed, the operator can view the new data.

With the provisions of the various clipping and viewing tools 109, 111 and 113, the user is provided the ability to utilize a graphic image of data in a database, manipulate the data on a display in accordance with the selection of the various cutting tools and modify the stored data in accordance with these manipulations. For example, a tool could be utilized to manipulate multiple variables over a given time range to delete all of that data from the input database and reflect it as "cut" data. This would act similar to a situation wherein a certain place in the data set had missing data, which would require a data reconciliation scheme in order to reproduce this data in the input data stream. Additionally, the data can be "clipped"; that is, a graphical tool can be utilized to determine the level at which all data above that level is modified to. All data in the data set, even data not displayed, can then be modified to this level. This in effect constitutes applying an algorithm to that data set.

In FIG. 7f, the flowchart depicts the operation of utilizing the graphical tools for cutting data. An initiation block, block 1117, indicates the acquisition of the data set. The program then flows to a decision block 119 to determine if the variables have been selected and manipulated for display. If not, the program flows along an "N" path to a function block 121 to select the display type and then to a function block 123 to display the data in the desired format. The program then flows to a decision block 125 to indicate the operation wherein the tools for modifying the data are selected. When this is done, the program flows along a "DONE" line back to the output of decision block 119 to determine if all of the variables have been selected.

However, if the data is still in the modification stage, the program flows to a decision block 127 to determine if an operation is canceled and, if so, flows back around to the input of decision block 125. If the operation is not canceled, the program flows along an "N" path to a function block 129 to apply the algorithmic transformation to the data and then to a function block 131 to store the transform as part of a sequence. The program then flows back to the input of function block 123. This continues until the program flows along the "DONE" path from decision block 125 back to the input of decision block 119.

Once all the variables have been selected and displayed, the program flows from decision block 119 along a "Y" path to the input of a decision block 133 to determine if the transformed data is to be saved. If not, the program flows along an "N" path to a "DONE" block 135 and, if not, the program flows from the decision block 133 along the "Y" path to a function block 137 to transform the data set and then to the "DONE" block 135.

Figure 8:
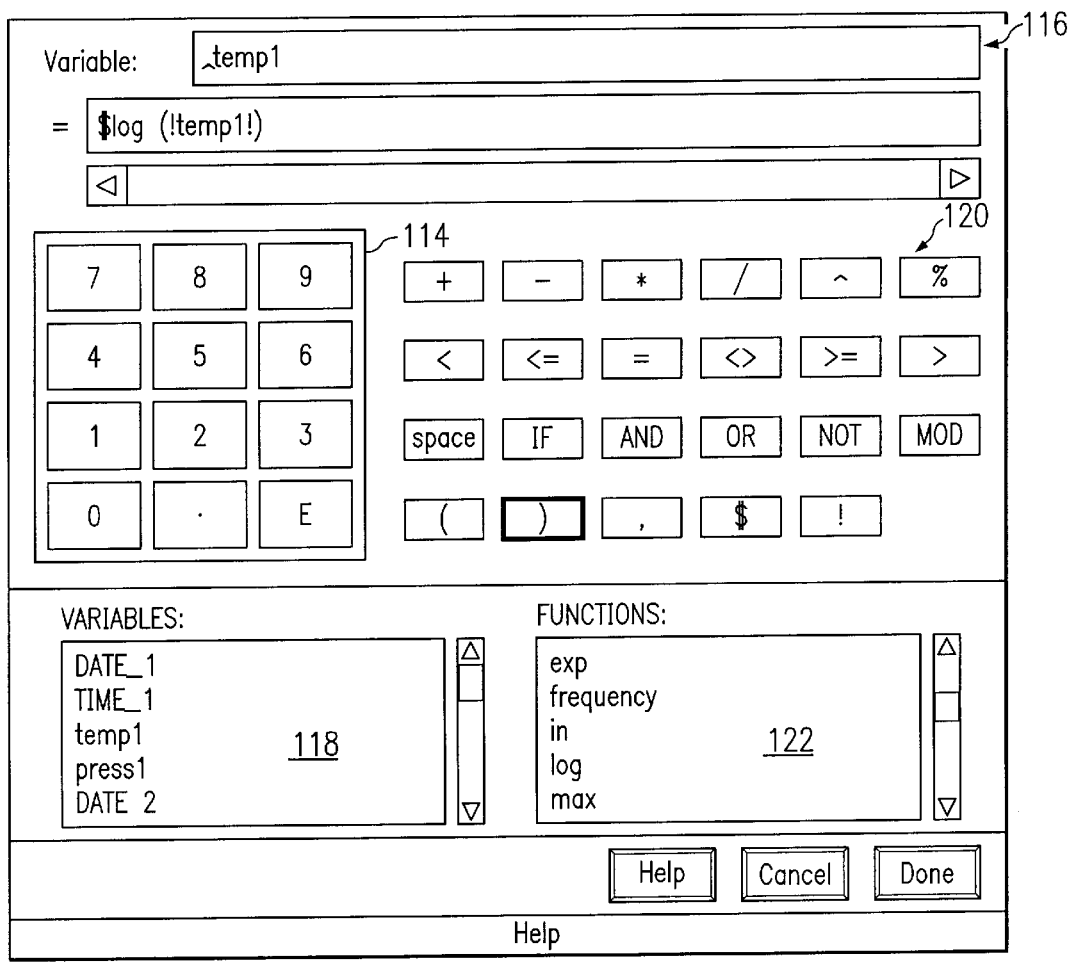
FIG. 8 illustrates the display for the algorithm selection operation.

Referring now to FIG. 8, there is illustrated a diagrammatic view of the display for performing the algorithmic functions on the data. The operator merely has to select this display, which display is comprised of a first numerical template 114, that provides a numerical keypad function. A window 116 is provided that displays the variable that is being operated on. The variables that are available are illustrated in a window 118 which illustrates the various variables. In this example, the various variables are arranged in groups, one group illustrating a first date and time and a second group illustrated by a second date and time. This is prior to time merging. The illustrated window 118 has the variables temp1 and press 1 and the variable press2, it being noted that press2 is on a different time scale than temp1. A mathematical operator window 120 is provided that provides the various mathematical operators such as "+", "−", etc. Various logical operators are also available in the window 120. A function window 122 is provided that allows selection of various mathematical functions, logical functions, etc.

In the example illustrated in FIG. 8, the variable temp1 is selected to be processed and provide the logarithmic function thereof. In this manner, the variable temp1 is first selected from window 118 and then the logarithmic function "LOG" is selected from the window 122. The left parentheses is then selected, followed by the selection of the variable temp1 from window 118 and then followed by the selection of the right parentheses from window 120. This results in the selection of an algorithmic process which comprises a logarithm of the variable temp1. This is then stored as a sequence, such that upon running the data through the run-time sequence, data associated with the variable temp1 has the logarithmic function applied thereto prior to inputting to the run-time system model 26. This operation can be continued for each operation.

After the data has been manually preprocessed as described above with reference to FIGS. 7a–7f, the resultant data would be as depicted in Table 1. It can be seen in Table 1 that there is a time scale difference, one group being illustrated with respect to the time TIME_1 and one group associated with the column TIME_2. It can be seen that the first time scale is on an hourly interval and that the second time scale is on a two hour interval. Although "cut" data is not illustrated, it would appear as missing data.

TABLE 1

| Name Row | DATE_1 Col 1 | TIME_1 Col 2 | temp1 Col 3 | press1 Col 4 | DATE_2 Col 5 | TIME_2 Col 6 | flow1 Col 7 | temp2 Col 8 |
|---|---|---|---|---|---|---|---|---|
| 36 | 1/2/92 | 12:00:59 | 81.87 | 1552.80 | 1/3/92 | 23:00:59 | 1211.00 | 276.95 |
| 37 | 1/2/92 | 13:00:59 | 58.95 | 1489.19 | 1/4/92 | 01:00:59 | 1210.90 | 274.44 |
| 38 | 1/2/92 | 14:00:59 | 83.72 | 1558.00 | 1/4/92 | 3:00:591 | 1211.09 | 277.38 |
| 39 | 1/2/92 | 15:00:59 | 53.72 | 1474.40 | 1/4/92 | 5:01:00 | 1210.69 | 274.01 |

After the data has been manually preprocessed, the algorithmic processes are applied thereto. In the example described above with reference to FIG. 8, the variable temp1 was processed by taking a logarithm thereof. This would result in a variation of the set of data associated with the variable temp1. This is illustrated in Table 2.

TABLE 2

| Name Row | DATE_1 Col 1 | TIME_1 Col 2 | temp1 Col 3 | press1 Col 4 | DATE_2 Col 5 | TIME_2 Col 6 | flow1 Col 7 | temp2 Col 8 |
|---|---|---|---|---|---|---|---|---|
| 36 | 1/2/92 | 12:00:59 | 1.91 | 1552.80 | 1/3/92 | 23:00:59 | 1211.00 | 276.95 |
| 37 | 1/2/92 | 13:00:59 | 1.77 | 1489.19 | 1/4/92 | 01:00:59 | 1210.90 | 274.44 |
| 38 | 1/2/92 | 14:00:59 | 1.92 | 1558.00 | 1/4/92 | 3:00:591 | 1211.09 | 277.38 |
| 39 | 1/2/92 | 15:00:59 | 1.73 | 1474.40 | 1/4/92 | 5:01:00 | 1210.69 | 274.01 |

The sequence of operation associated therewith would define the data that was cut out of the original data set for data temp1 and also the algorithmic processes associated therewith, these being in a sequence which is stored in the sequence block 14 and which may be examined via the data-column properties module 113, shown as follows:

markcut(temp1, 1, 2068, 920.844325, 1600000000000000000000.000000)

markcut(temp1, 1, 58, 73, −1600000000000000000.000000, 1600000000000000000000)

$ log(temp1)

To perform the time merge, the operator selects the time merge function 115, illustrated in FIGS. 7a–7f, and specifies the time scale and type of time merge algorithm. In the present case, a one-hour time-scale was selected and the box-car algorithm of merging was used.

After time merge, the time scale is disposed on an hourly interval with the time merge process. This is illustrated in Table 3, wherein all of the data is now on a common time scale and the cut data has been extrapolated to insert new data therefor. This is illustrated in Table 3.

TABLE 3

| Name Row | Date | time Col 1 | temp1 Col 2 | press1 Col 3 | flow1 Col 4 | temp2 Col 5 | press2 Col 6 | flow2 Col 7 |
|---|---|---|---|---|---|---|---|---|
| 36 | 1/2/92 | 12:00:00 | 1.87 | 1530.00 | 1211.69 | 274.50 | 2160.00 | 533.29 |
| 37 | 1/2/92 | 13:00:00 | 1.87 | 1530.00 | 1211.69 | 274.50 | 2160.00 | 533.29 |
| 38 | 1/2/92 | 14:00:00 | 1.87 | 1530.00 | 1211.69 | 274.50 | 2160.00 | 533.29 |
| 39 | 1/2/92 | 15:00:00 | 1.87 | 1530.00 | 1211.69 | 274.50 | 2160.00 | 533.29 |

The sequence after time merge will include the data that is cut from the original data sets, the algorithmic processes utilized during the pre-time merge processing and the merge data. This is illustrated as follows:

markcut(temp1, 1, 2068, 938.633160, 1600000000000000000000.000000)

markcut(temp1, 57, 71, −1600000000000000000.000000, 1600000000000000000000)

$ log(temp1)

tmerge(temp1, time, 0, 1666666663417741312.000000)

After the time merge operation, additional processing can be utilized. To perform this, the display of FIG. 8 is again pulled up, and the algorithmic process selected. One example would be to take the variable temp1 after time merge and a value of 5000 to this variable. This would result in each value in the column associated with the variable temp1 being increased by that value. This would result in the data in Table 4.

The sequence would then be updated with the following sequence:

markcut(temp1, 1, 2068, 938.633160, 1600000000000000000000.000000)

markcut(temp1, 57, 71, −1600000000000000000.000000, 1600000000000000000000)

$ log(temp1)

tmerge (temp1, time, 0, 1666666663417741312.0000000)

temp1 +5000

Figure 9:
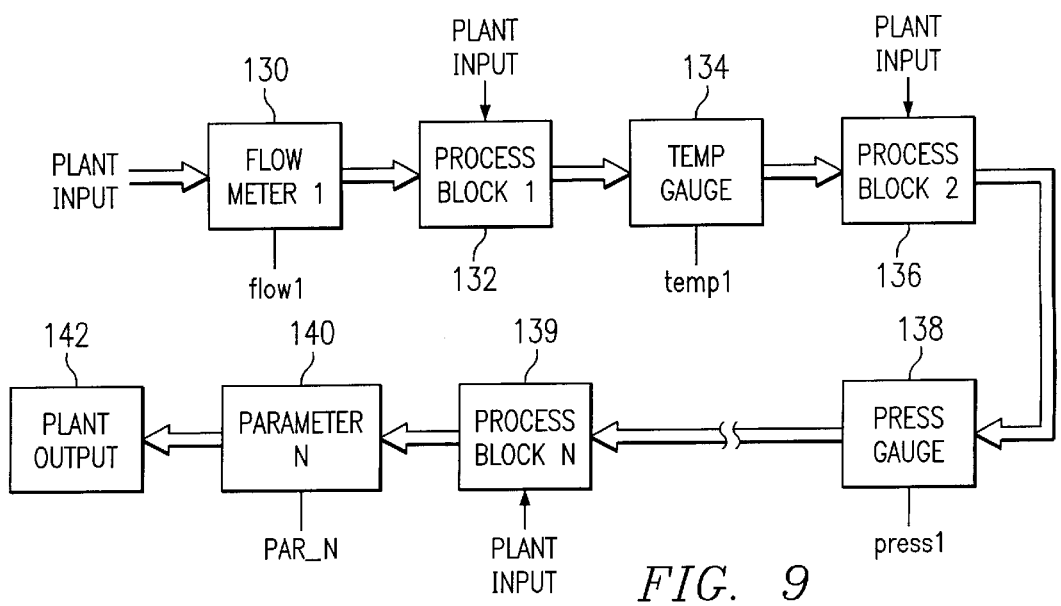
FIG. 9 illustrates a block diagram of a plan depicting the various places in the process flow that parameters occur relative to the plant output.

Referring now to FIG. 9, there is illustrated a block diagram of the process flow through a plant. There is a general flow input to the plant which is monitored at some point by flow meter 130, the flow meter 130 providing a variable output flow1. The flow continues to a process block 132, wherein various plant processes are carried out. The various plant inputs are provided to this process block. The process then flows to a temperature gauge 134 to output a variable temp1. The process then flows to a process block 136 to perform other plant processes, these also receiving plant inputs. The process then flows to a pressure gauge 138, this outputting a variable press1. The process continues with various other process blocks 140 and other parameter measurement blocks 140. This results in an overall plant output 142 which is the desired plant output. It can be seen that numerous processes occur between the output of parameter flow1 and the plant output 142. Additionally, other plant outputs such as press1 and temp1 occur at different stages in the process. This results in delays between a measured parameter and an effect on the plant output.

Figure 10:
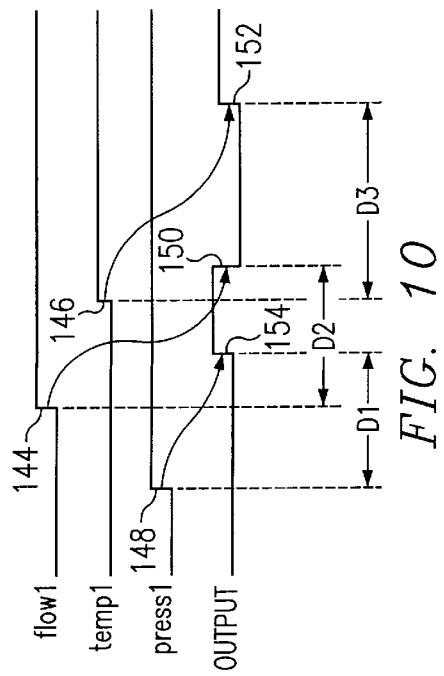
FIG. 10 illustrates a diagrammatic view of the relationship between the various plant parameters and the plant output.

Referring now to FIG. 10, there is illustrated a timing diagram illustrating the various effects of the output variables from the plant and the plant output. The output variable flow1 experiences a change at a point 144. Similarly, the output variable temp1 experiences a change at a point 146 and the variable press1 experiences a change at a point 148. However, the corresponding change in the output is not time

TABLE 4

| Name Row | Date | time Col 1 | temp1 Col 2 | press1 Col 3 | flow1 Col 4 | temp2 Col 5 | press2 Col 6 | flow2 Col 7 |
|---|---|---|---|---|---|---|---|---|
| 36 | 1/2/92 | 12:00:00 | 5001.877 | 1530.00 | 1211.699 | 274.50 | 2160.00 | 533.29 |
| 37 | 1/2/92 | 13:00:00 | 5001.87 | 1530.00 | 1211.69 | 274.50 | 2160.00 | 533.29 |
| 38 | 1/2/92 | 14:00:00 | 5001.87 | 1530.00 | 1211.69 | 274.50 | 2160.00 | 533.29 |
| 39 | 1/2/92 | 15:00:00 | 5001.87 | 1530.00 | 1211.69 | 274.50 | 2160.00 | 533.29 | synchronous with the changes in the variables. Referring to the diagram labeled OUTPUT, changes in the plant output occur at points 150, 152 and 154, for the respective changes in the variables at points 144–148, respectively. The change between points 144 and 150 and the variable flow1 and the output, respectively, experience a delay D2. The change in the output of point 152 associated with the change in the variable temp1 occurs after delay D3. Similarly, the change in the output of point 154 associated with the change in the variable press1 occurs after a delay of D1. In accordance with one aspect of the present invention, these delays are accounted for during training, and, subsequently, during the run-time operation, these delays are also accounted for.

Figure 11:
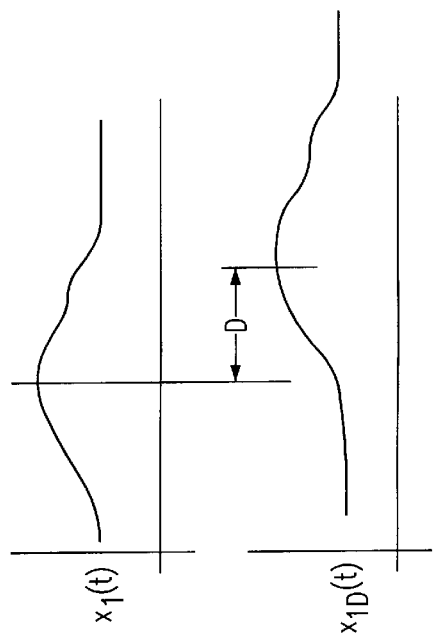
FIG. 11 illustrates a diagrammatic view of the delay provided for input data patterns.

Referring now to FIG. 11, there is illustrated a diagrammatic view of the delay for a given input variable $x_1(t)$. It can be seen that a delay D is introduced to the system to provide an output $x_{1D}(t)$ such that $x_{1D}(t)=x_1(t-D)$, this output is then input to the network. As such, the measured plant variables now coincide in time with the actual effect that is realized in the measured output such that, during training, a system model can be trained with a more accurate representation of the system.

Figure 12:
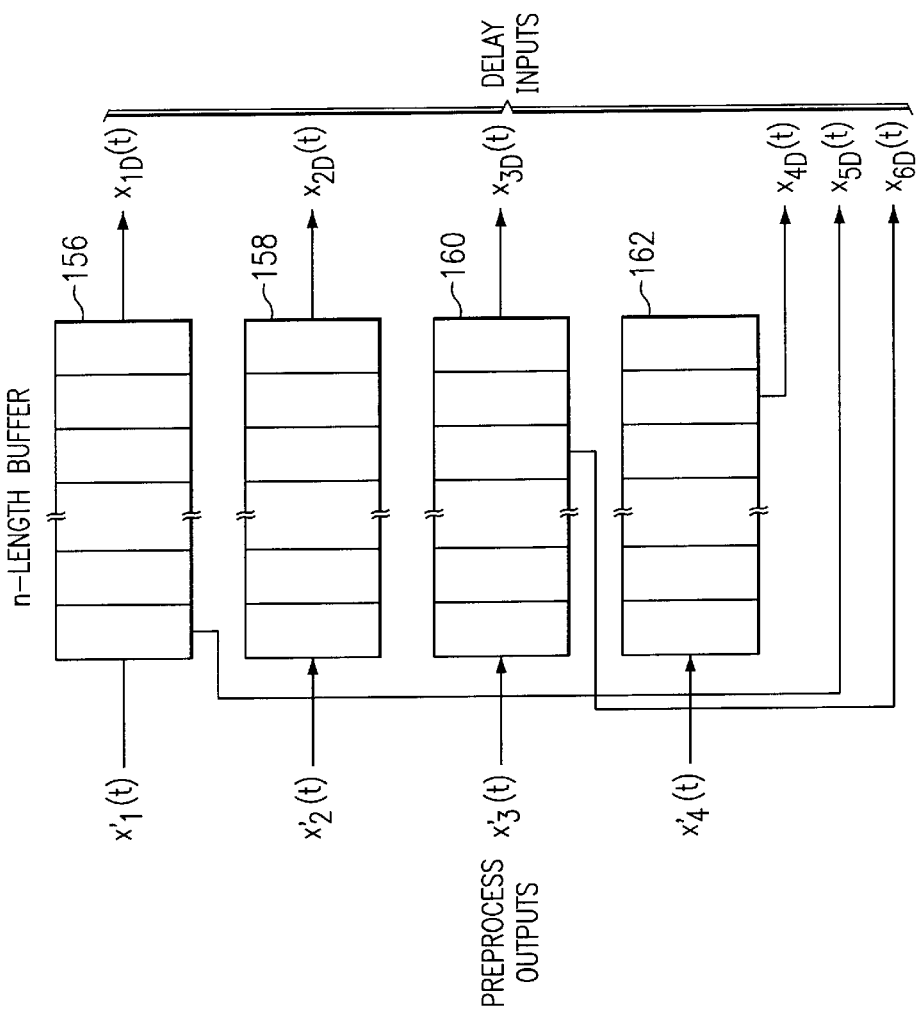
FIG. 12 illustrates a diagrammatic view of the buffer formation for each of the network inputs and the method for generating the delayed network input.

Referring now to FIG. 12, there is illustrated a diagrammatic view of the method of the preferred embodiment for implementing the delay. Rather than provide an additional set of data for each delay that is desired, $x(t+\tau)$, variable length buffers are provided in each data set after preprocessing, the length of which corresponds to the longest delay. Multiple taps are provided in each of the buffers to allow various delays to be selected. In FIG. 12, there are illustrated four buffers 156, 158, 160 and 162, associated with the preprocessed inputs $x_1'(t)$, $x_s'(t)$, $x_3'(t)$ and $x_r'(t)$. Each of the buffers has a length of N, such that the first buffer outputs the delay input $X_{1D}(t)$, the second buffer 158 outputs the delay input $x_{2D}(t)$ and the buffer 160 outputs the delay input $X_{3D}(t)$. The buffer 162, on the other hand, has a delay tap that provides for a delay of "n−1" to provide an output $X_{4D}(t)$. An output $X_{5D}(t)$ is provided by selecting the first tap in the buffer 156 such that the relationship $x_{5D}(t)=x_1'(t+1)$. Additionally, the delayed input $x_{6D}(t)$ is provided which is selected as a tap output of the buffer 160 with a value of $\tau=2$. This results in the overall delay inputs to the training model 20. Additionally, these delays are stored as delay settings for use during the run-time.

Figure 13:
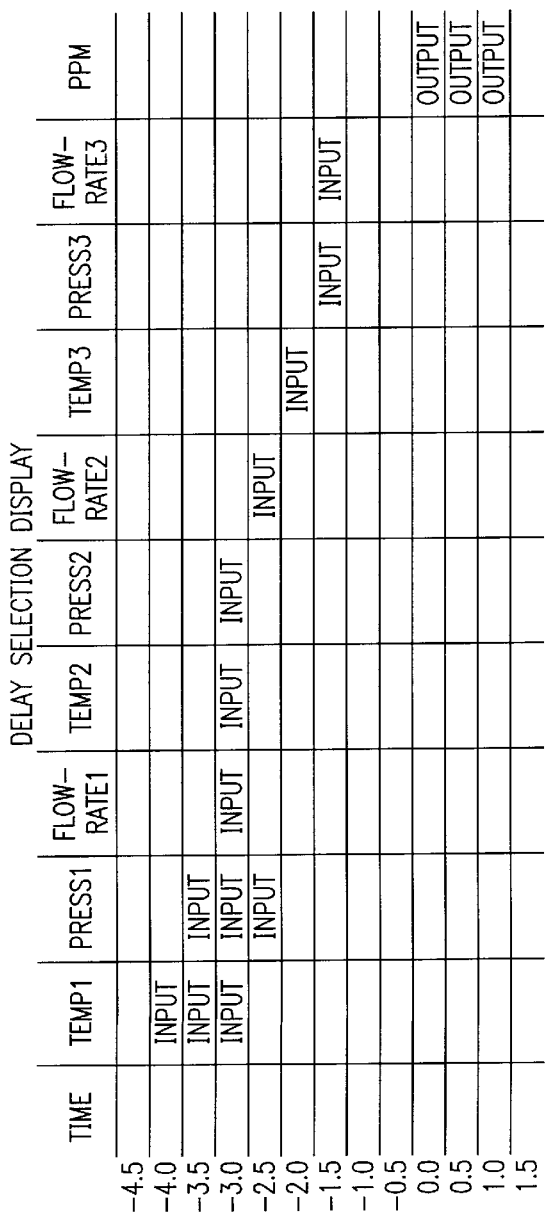
FIG. 13 illustrates the display for selection of the delays associated with various inputs and outputs in the neural network model.

Referring now to FIG. 13, three is illustrated a display that is provided to the operator for selecting the various delays to be applied to the input variables and the output variables utilized in training. In this example, it can be seen that by selecting a delay for the variable temp1 of −4.0, −3.50 and −3.00, three separate input variables have not been selected for input to the training model 20. Additionally, three separate outputs have been selected, one for delay 0.00, one for a delay 0.50 and one for a delay of 1.00 to predict present and future values of the variable. Each of these can be processed to vary the absolute value of the delays associated with the input variables. It can therefor be seen that a maximum buffer of −4.0 for an output of 0.00 will be needed in order to provide for the multiple taps. Further, it can be see that it is not necessary to completely replicate the data in any of the delayed variable columns as a separate column, thus increasing the amount of memory utilized.

Figure 14:
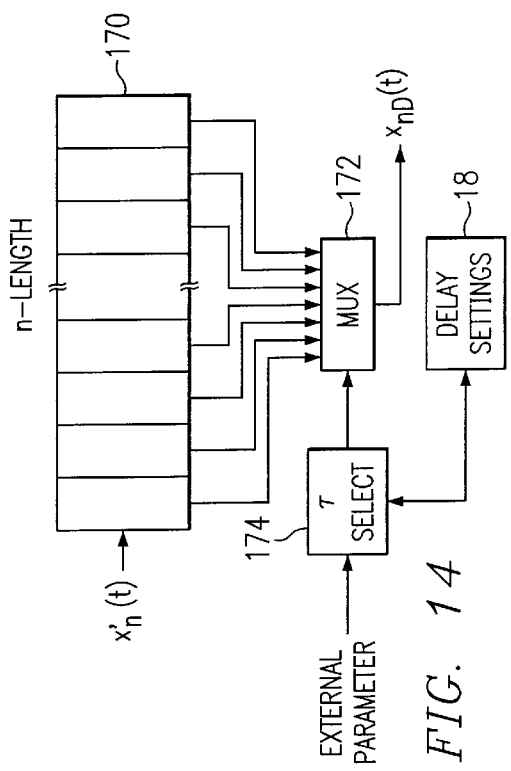
FIG. 14 illustrates a block diagram for a variable delay selection.

Referring now to FIG. 14, there is illustrated a block diagram for generating process dependent delays. A buffer 170 is illustrated having a length of N, which receives an input variable $x_n'(t)$ from the preprocessor 12 to provide on the output thereof an output $x_{nD}(t)$ as a delayed input to the training model 20. A multiplexer 172 is provided which has multiple inputs, one from each of the n buffer registers with a τ-select circuit 174 provided for selecting which of the taps to output. The value of τ is a function of other variables parameters such as temperature, pressure, flow rates, etc. For example, it may have been noted empirically that the delays are a function of temperature. As such, the temperature relationship could be placed in the block 74 and then the external parameters input and the value of τ utilized to select the various taps input to the multiplexer 172 for output therefrom as a delay input. The system of FIG. 14 can also be utilized in the run-time operation wherein the various delay settings and functional relationships of the delay with respect to the external parameters are stored in the storage area 18. The external parameters can then be measured and the value of τ selected as a function of this temperature and the functional relationship provided by the information stored in the storage area 18. This is to be compared with the training operation wherein this information is externally input to the system. For example, with reference to FIG. 13, it could be noticed that all of the delays for the variable temp1 must be shifted up by a value of 0.5 when the temperature reached a certain point. With the use of the multiple taps, as described with respect to FIGS. 12 and 14, it is only necessary to vary the value of the control input to the multiplexers 172 associated with each of the variables, it being understood that in the example of FIG. 13, three multiplexers 172 would be required for the variable temp1, since there are three separate input variables.

Figure 15A:
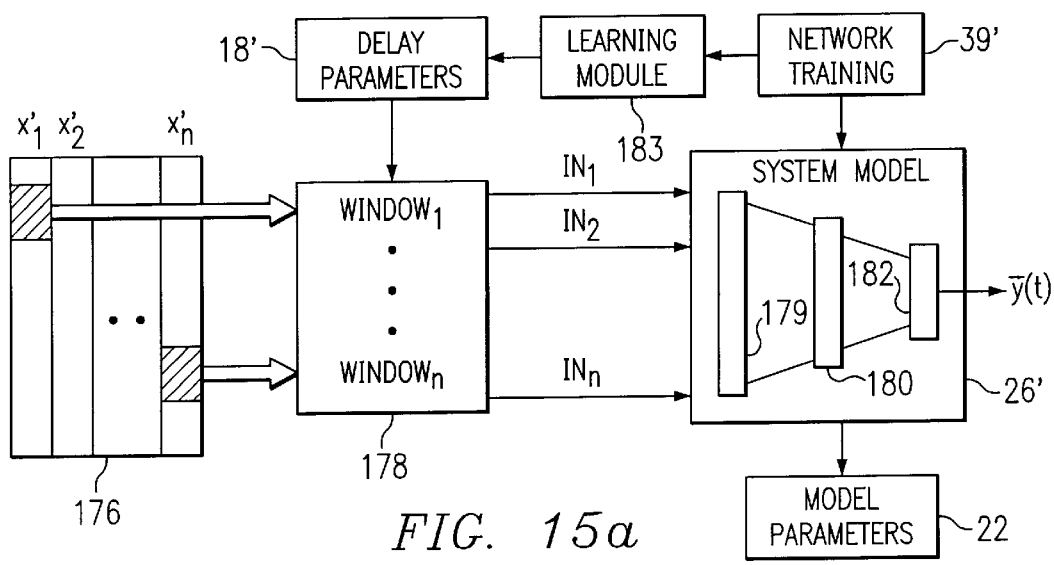
FIG. 15a illustrates a block diagram of the adaptive determination of the delay.

Referring now to FIG. 15a, there is illustrated a block diagram of the preprocessing system for setting the delay parameters, which delay parameters are learned. For simplicity purposes, the preprocessing system is not illustrated; rather, a table 176 of the preprocess data is illustrated. Further, the method for achieving the delay differs somewhat, as will be described hereinbelow. The delay is achieved by a time delay adjustor 178, which time delay adjustor utilizes the stored parameters in a delayed parameter block 18'. The delay parameter block 18' is similar to the delay setting block 18, with the exception that absolute delays are not contained therein. Rather, information relating to a window of data is stored in the delay parameter block 18'. The time delay adjustor 178 is operable to select a window of data within in each set of data in the table 176 the data labeled $x_1'$ through $x_n'$. The time delay adjustor 178 is operable to receive data within a defined window associated with each of the sets of data $x_1'-x_n'$ and convert this information into a single value for output therefrom as an input value $in_1-in_n$. These are directly input to a system model 26', which system model 26' is similar to the run-time system model 26 and the training model 20 in that it is realized with a non-linear neural network. The non-linear neural network is illustrated as having an input layer 179, a hidden layer 180 and an output layer 182. The hidden layer 180 is operable to map the input layer 179 to the output layer 182, as will be described hereinbelow. However, note that this is a non-linear mapping function. By comparison, the time delay adjustor 178 is operable to linearly map each of sets of data $x_1'-x_n'$ in the table 176 to the input layer 179. This mapping function is dependent upon the delay parameters in the delay parameter block 18'. As will be described hereinbelow, these parameters are learned under the control of a learning module 183, which learning module 183 is controlled during the network training in the training mode. It is similar to that described above with respect to FIG. 1a.

During learning, the learning module 183 is operable to control both the time delay adjustor block 178 and the delay parameter block 18' to change the values thereof in training of the system model 26'. During training, target outputs are input to the output layer 182 and a set of training data input thereto in the form of the chart 176, it being noted that this is already preprocessed in accordance with the operation as described hereinabove. The model parameters of the system model 26' stored in the storage area 22 are then adjusted in accordance with a predetermined training algorithm to minimize the error. However, the error can only be minimized to a certain extent for a given set of delays. Only by setting the delays to their optimum values will the error be minimized to the maximum extent. Therefore, the learning module 183 is operable to vary the parameters in the delay parameter block 18' that are associated with the timing delay adjustor 178 in order to further minimize the error.

Figure 15B:
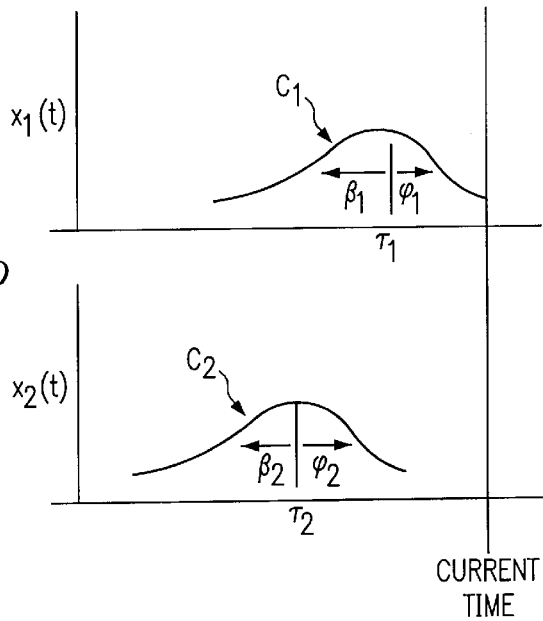
FIG. 15b illustrates examples of the time-delay functions used in adaptive or variable time-delay modes.

Since direct targets for the time delays are not readily available, some measure for adjusting them through indirect targets is required. In FIG. 15b, the time delay adjustor utilizes a window that provides a weighted distribution from a center time delay extending outward therefrom. Illustrated are waveforms for $x_1(t:)$ and $x_2(t)$. The waveform is defined as $C_i(\tau_i, \alpha_i, \beta_i)$. Therefore, each of the data columns is parameterized via three numbers, the time lag value $\tau_i$, the leading edge time-rise width $\alpha_i$ and the trailing edge width $\beta_i$. The inputs to the neural network representing the system model 26' would then be the convolution of this time-lag window and the data from the taps from the associated column. The input value would be as follows:

$$\text{in}_i(t) = \int_{t'=0}^{t'=t} C_i(t' - t, x_i(t'), \tau_i, \alpha_i, \beta_i) dt' \tag{5}$$

Or, the discretely:

$$\text{in}_i(t) = \sum_{j=0}^{j=t} C_i(j' - t, x_i(j), \tau_i, \alpha_i, \beta_i) \tag{6}$$

where, e.g., $$C_i(j' - t, x_i(j), \tau_i, \alpha_i, \beta_i) = e^{-((j'-t)-\tau_i)^2/2 \frac{(\alpha_i + \beta_i)}{2^2}} \tag{7}$$

Equation 4 represents a Gaussian window. Given this function for each of the inputs, the network can then learn on the parameters $\tau_i$, $\alpha_i$ and $\beta_i$.

To achieve the above learning, an error function is required. This error function utilizes the neural network error function as follows:

$$E = \sum_{j=0}^{N_{PATS}} (\vec{y}(j) - \vec{o}(j))^2 \tag{8}$$

where the value y(j) is the target of the network and the value o(j) is the output of the net and $N_{PATS}$ is the number of training patterns. The output of the network is dependent on several parameters:

$$)= O_i(j, W_{k1}, \text{in}(j)) = O_i(j, W_{k1}, C_i(j, \tau_i, \alpha_i, \tag{9}$$

where, $W_{k1}$ is the matrix of neural network weights, learned by gradient descent:

$$\Delta W_{kl} = -\eta \frac{\partial E}{\partial W_{kl}} \tag{10}$$

and $C_i$ is the convolution window with parameters $\tau_i$, $\alpha_i$ and $\beta_i$ are also learned by gradient descent; that is:

$$\Delta \tau_i = -\eta \frac{\partial E}{\partial T_i} \tau_i \geq 0 \tag{11}$$

$$\Delta \alpha_i = -\eta_\alpha \frac{\partial E}{\partial \alpha_i} \alpha_i > 0 \tag{12}$$

$$\Delta \beta_i = -\eta_\beta \frac{\partial E}{\partial \beta_i} \beta_i > 0 \tag{13}$$

where $\eta_W$, $\eta_\tau$, $\eta_\alpha$ and $\eta_\beta$ are learning rates usually chosen such that $\tau_i$, $\alpha_i$ and $\beta_i$ adjust more slowly than $W_{k1}$. That is, $\eta_W$ is approximately equal to ten times the value of $\eta_\tau$ and $\eta_\tau$ is approximately equal to $\eta_\alpha$ and is approximately equal to $\eta_\beta$. This learning will allow the network to find the best $\eta_i$, $\alpha_i$ and $\beta_i$ to maximize the model fit and therefore minimize error.

Figure 16:
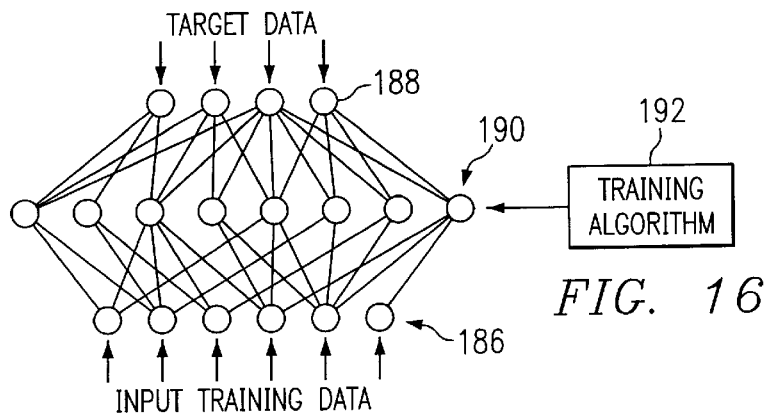
FIG. 16 illustrates a diagrammatic view of a conventional multi-layer neural network.

Referring now to FIG. 16, there is illustrated a schematic view of a conventional neural network utilized for the training model 20 and for the run-time system model 26. The neural network is a multi-layer network comprised of a plurality of input nodes 186 and a plurality of output nodes 188. A plurality of hidden nodes 190 are provided which are interconnected through a first interconnection layer, the input interconnection layer, to the input layer nodes 186. Each of the hidden nodes in layer 190 may have a separate weighted connection to each of the nodes in the input layer 186, or select ones thereof. Similarly, an output interconnection layer is provided between the hidden layer 190 and the output layer 188 such that each of the hidden nodes 190 is connected through a weighted interconnection to each of the output nodes 188 or select ones thereof. The weighted interconnections and the values thereof define the stored representation, and these weights are the values that are learned during the training operation. In general, the learning operation comprises target data input to the output nodes 188, which are utilized for a compare operation and then a training algorithm, such as a back propagation technique is utilized, as illustrated by block 192. This is a conventional type of architecture. As will be described hereinbelow, this network is trained through any one of a number of training algorithms and architectures such as Radial Basis Functions, Gaussian Bars, or conventional backpropagation techniques. The backpropagation learning technique is generally described in D. E. Rumelhart, G. E. Hinton & R. J. Williams, *Learning Internal Representations by Error Propagation* (in D. E. Rumelhart & J. L. McClennand, *Parallel Distributed Processing*, Chapter 8, Vol. 1, 1986), which document is incorporated herein by reference. In this type of algorithm, a set of training data is input to the input layer 186 to generate an output, which output in the output layer 188 is then compared to the target data. An error is then generated, and this error back propagated from the output layer 188 to the input layer 186 with the values of the weights on the input interconnect layer and the output interconnect layer changed in accordance with the gradient descent technique. Initially, the error is very large, but as training data is sequentially applied to the input, and this compared to corresponding target output data, the error is minimized. If sufficient data is provided, the error can be minimized to provide a relatively accurate representation of the system.

Figure 17:
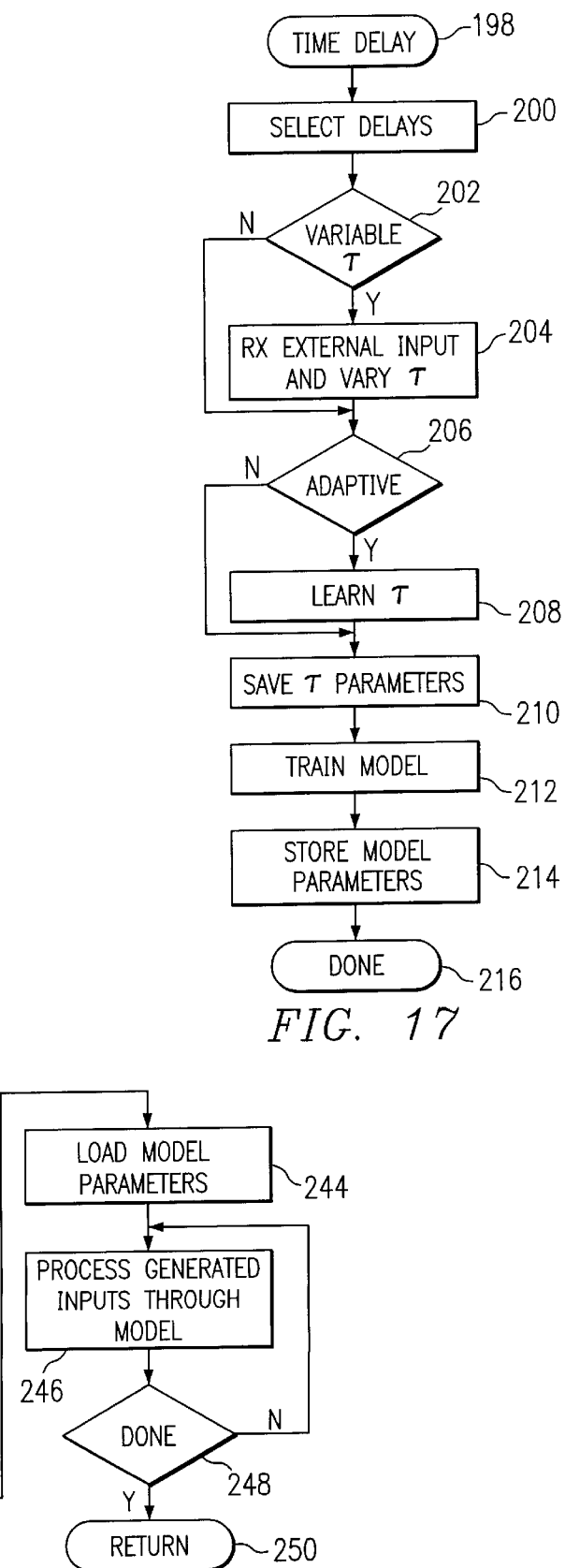
FIG. 17 illustrates a flowchart depicting the time delay operation.

Referring now to FIG. 17, there is illustrated a flowchart illustrating the determination of time delays for the training operation. This flowchart is initiated at a block 198 and then flows to a function block 200 to select the delays, this performed by the operator as described above with respect to FIG. 13. The program then flows to a decision block 202 to determine whether variable τs are to be selected. The program flows along a "Y" path to a function block 204 to receive an external input and vary the value of τ in accordance with the relationship selected by the operator, this being a manual operation in the training mode. The program then flows to a decision block 206 to determine whether the value of τ is to be learned by an adaptive algorithm. If variable τs are not to be selected in the decision block 202, the program then flows around the function block 204 along the "N" path thereof.

If the value of τ is to be learned adaptively, the program flows from the decision block 206 to a function block 208 to learn the value of τ adaptively. The program then flows to a function block 210 to save the value of τ. If no adaptive learning is required, the program flows from the decision block 206 along the "N" path to function block 210. After the τ parameters have been determined, the model 20 is trained, as indicated by a function block 212 and then the parameters stored, as indicated by a function block 214 and then the program flows to a DONE block 216.

Figure 18:
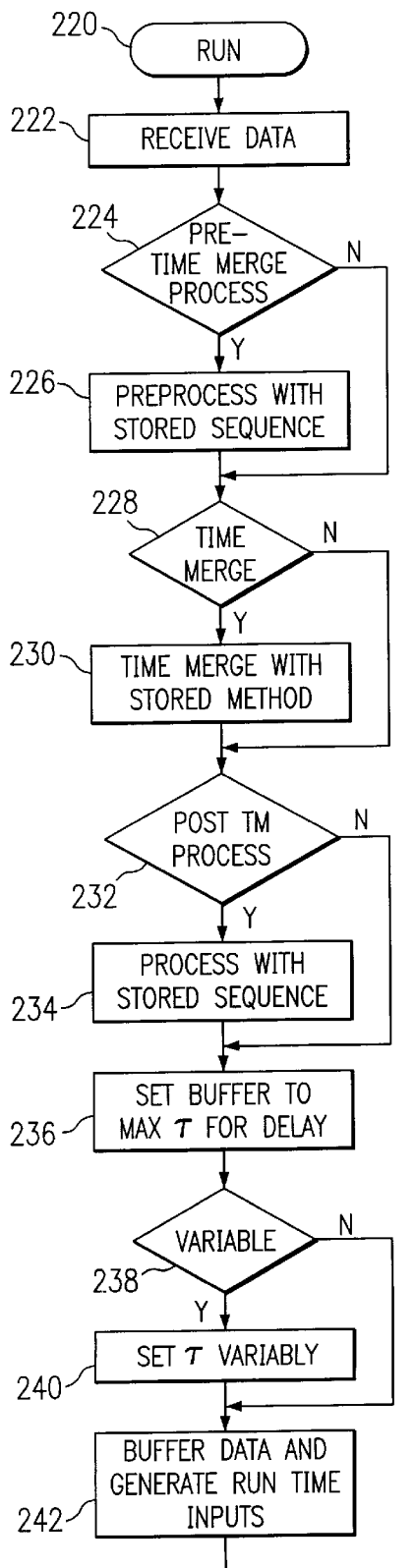
FIG. 18 illustrates a flowchart depicting the run mode operation.

Referring now to FIG. 18, there is illustrated a flowchart depicting the operation in the run-time mode. This is initiated at a block 220 and then flows to a function block 222 to receive the data and then to a decision block 224 to determine whether the pre-time merge process is to be entered. If so, the program flows along a "Y" path to a function block 226 and then to a decision block 228. If not, the program flows along the "N" input path to the input of decision block 228. Decision block 228 determines whether the time merge operation is to be performed. If so, the program flows along the "Y" path to function block 230 and then to the input of a decision block 232 and, if not, the program flows along the "N" path to the decision block 232. The decision block 232 determines whether the post-time merge process is to be performed. If so, the program flows along the "Y" path to a function block 234 to process the data with the stored sequence and then to a function block 236 to set the buffer equal to the maximum τ for the delay. If not, the post-time merge process is not selected, the program flows from the decision block 232 along the "N" path thereof to the input of function block 236.

Function block 236 flows to a decision block 238 to determine whether the value of τ is to be varied. If so, the program flows to a function block 240 to set the value of τ variably, then to the input of a function block 242 and, if not, the program flows along the "N" path to function block 242. Function block 242 is operable to buffer data and generate run-time inputs and then flows to a function block 244 to load the model parameters. The program then flows to a function block 246 to process the generated inputs through the model and then to a decision block 248 to determine whether all of the data has been processed. If not, the program flows along the "N" path back to the input of function block 246 until all data is processed and then along the "Y" path to return block 250.

Figure 19:
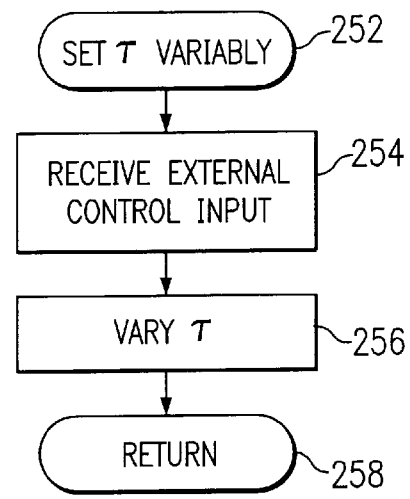
FIG. 19 illustrates a flowchart for setting the value of the variable delay.

Referring now to FIG. 19, there is illustrated a flowchart for the operation of setting the value of τ variably. The program is initiated at a block 252 and then proceeds to a function block 254 to receive the external control input. The value of τ is varied in accordance with the relationship stored in the storage area 14, as indicated by a function block 256 and then the program flows to a function block 258.

Figure 20:
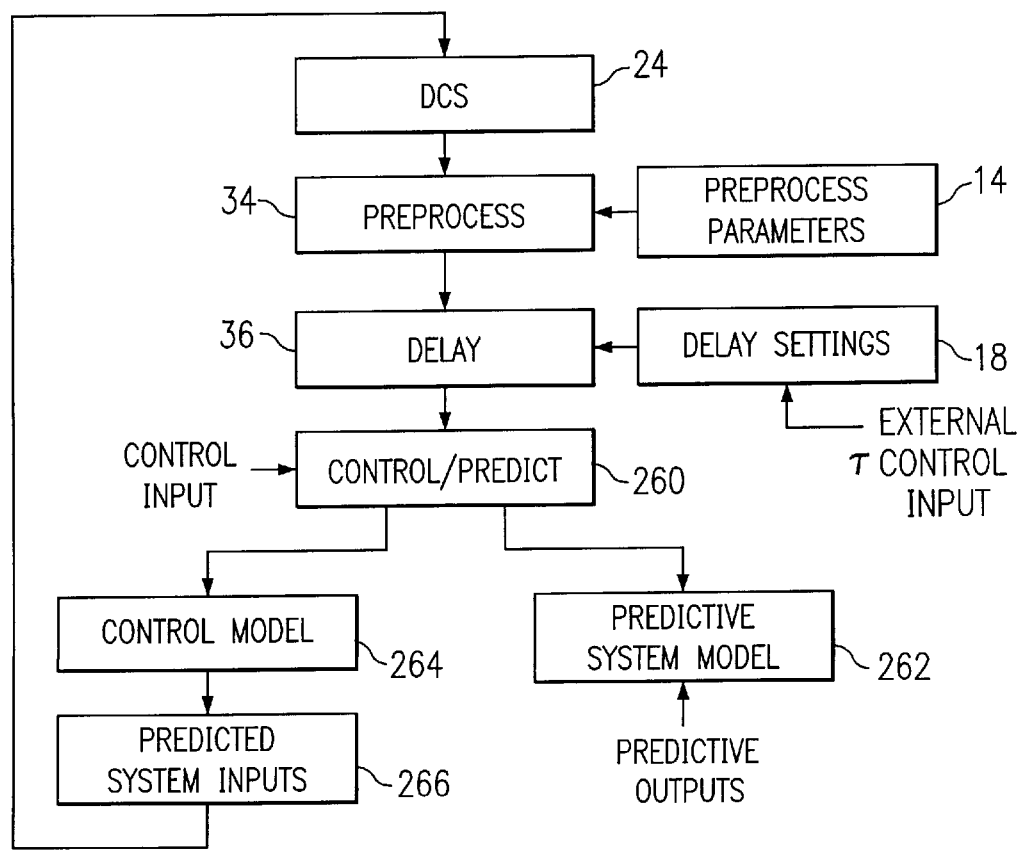
FIG. 20 illustrates a block diagram of the interface of the run-time preprocessor with a distributed control system.

Referring now to FIG. 20, there is illustrated a simplified block diagram for the overall run-time operation. Data is initially output by the DCS 24 during run-time. The data is then preprocessed in the preprocess block 34 in accordance with the preprocess parameters stored in the storage area 14. The data is then delayed in the delay block 36 in accordance with the delay setting set in the delay block 18, this delay block 18 also receiving the external block control input, which is comprised of parameters on which the value of τ depends to provide the variable setting operation that was utilized during the training mode. The output of the delay block is then input to a selection block 260, which receives a control input. This selection block 260 selects either a control network or a prediction network. A predictive system model 262 is provided and a control model 264 is provided. Both models 262 and 264 are identical to the training model 20 and utilize the same parameters; that is, models 262 and 264 have stored therein a representation of the system that was trained in the training model 20. The predictive system model 262 provides on the output thereof a predictive output and the control model 264 provides on the output thereof predicted system inputs for the DCS 24. These are stored in a block 266 and translated to control inputs to the DCS 24.

Figure 21:
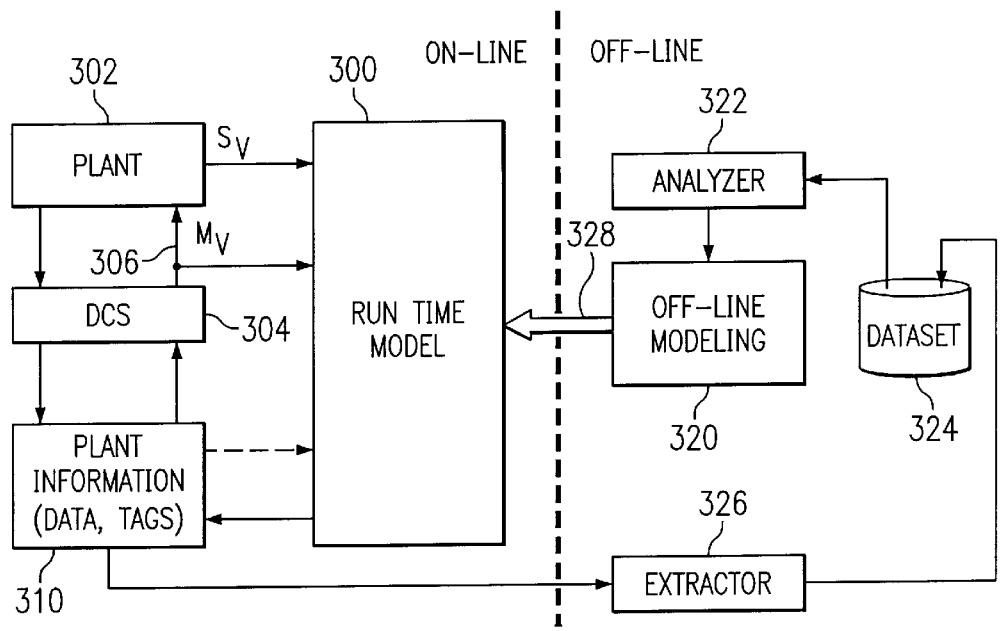
FIG. 21 illustrates a block diagram of the plant being controlled by a run-time model with off-line modeling allowing a model to be generated and analyzed prior to downloading the parameters thereof to the run-time model.

Referring now to FIG. 21, there is illustrated a block diagram of a system for generating a run-time model 300 to run a plant 302. The plant 302 is controlled by a distributed control system (DCS) 304 which is operable to generate the manipulatable variables (MV) on a line 306. The manipulatable variables on line 306 and the state variables (SV) or measurable variables from the plant 302 are input to the run-time model 300. The run-time model 300 is a predictive model which is operable to predict the output of the plant 302, this being referred to as a soft sensor. For example, the model 300 could predict an emissions level, this assuming that the run-time model 300 is trained to represent the emissions output of the plant, and provide the predicted output of the emissions. The plant 302 has associated therewith a historical database 310 which stores plant information therein. This information is in the form of data and various tags associated with the data. Tags are, in general, defined as a variable name. For example, there could be flow sensor output values, temperature output values, etc., which would constitute data. There could also be inputs such as valve settings, etc. Each of these tags would have associated therewith a certain amount of data, which data typically is time-based data.

The historical database 310 is utilized to collects information from the DCS 304. The information from the plant 302 in the form of the inputs and the measurable variables is then output through the DCS 304 to the historical database 310, which is operable to store all information relative to the operation of the plant 302 and the control thereof. The run-time model 300 is operable to generate the predicted output and store it in the historical database 310 or in the DCS 304 under a predicted tag. Typically, the system administrator will define what predicted tags are available and will define whether another user can write to that tag.

In conjunction with the run-time model 300, there is provided an off-line system. The off-line system is comprised of an off-line modeling process block 320 and a trainer 322. The off-line modeling block 320, as describes hereinabove, is the system for preprocessing data and generating a model for performing a prediction. The trainer 322 is operable to vary the data such that the various "what-ifs" and setpoints can be varied. The trainer 322 utilizes information from a dataset 324, which dataset 324 is made up of the original plant information stored in historical database 320. Typically, the information stored in historical database 310 is not in a format that is compatible with the off-line modeling component of the database 320 and, therefore, an extractor 326 is provided for extracting the data from the historical database 310 and then generating the dataset 324.

Once the off-line system has generated and analyzed a model, the parameters for this model are downloaded into the run-time model 300. The run-time model 300 typically generates a predicted output on a periodic basis and operates under an executable file. By terminating the operation of this executable file, data can be downloaded from the off-line modeling block 320 through a path 328 to the run-time model 300 in order to update its parameters. The run-time model 300 will then resume operating and generating new predicted values. This is analogous to having a sensor such as an emissions sensor that needs calibrating. During the calibration operation, the sensor is taken off-line and processed through the calibration process and the sensor input clamped to a known value. Once calibrated, the sensor is again placed on-line. In the system described herein, a new model is constructed from the historical data and then the new model is placed on-line in place of the old model. Of course, the old model could be updated with new data by training it utilizing a previously saved copy of the model in the off-line mode.

Figure 22:
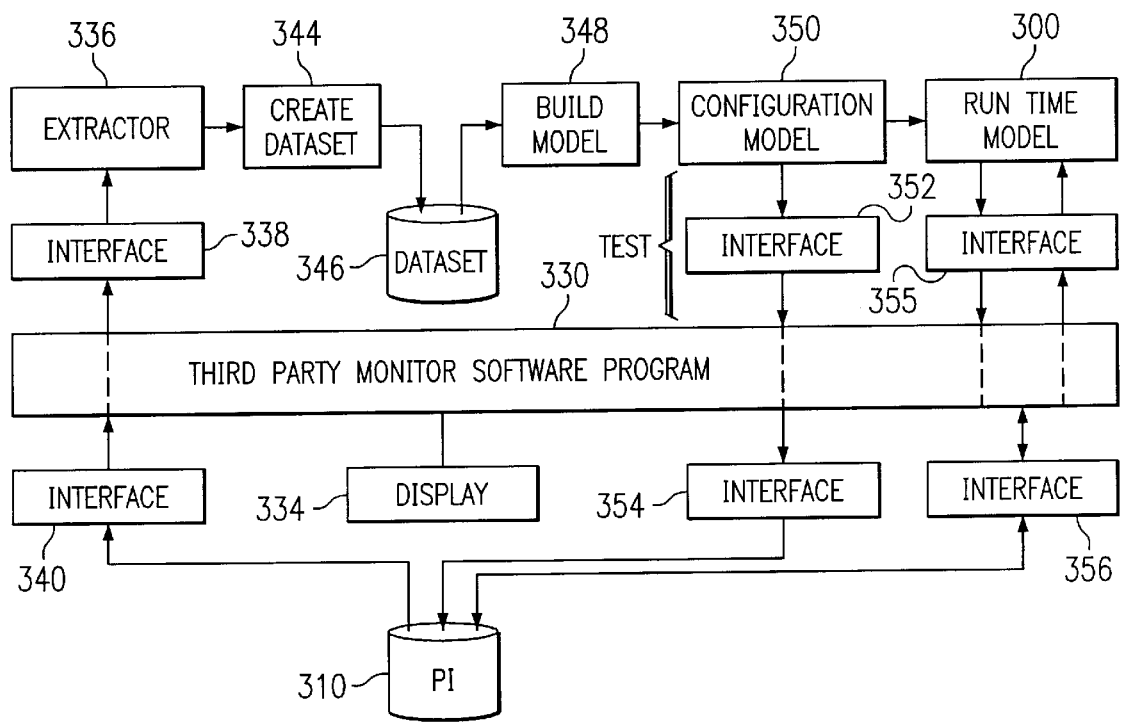
FIG. 22 illustrates a screen shot of a historian monitoring program.

Referring now to FIG. 22, there is illustrated a flow diagram illustrating the process for interfacing with the historical database 310 and then building a model, analyzing that model and downloading it to the run-time model 300, followed by a monitoring step. In general, there are numerous third party monitoring software programs represented by a block 330 or program 330. The program 330 is operable to interface with the historical database 310 to access information therefrom for the of purpose of monitoring and displaying information about the plant 302. Typically, this utilizes some type of graphical user interface (GUI). In order to allow other programs to access data in the historical database 310 and also utilize the same graphical user interface, there is typically provided some type of common file interface. In the preferred embodiment, the historical database monitoring block 330 utilizes what is referred to as an ActiveX container, which is a program marketed by Microsoft® Corporation. This program is basically utilized by the program 330 to allow other programs and software objects to be linked and embedded in program 330 and to run inside the ActiveX container as ActiveX controls. Similarly, the program 330 will typically run over a separate operating system platform, such as Microsoft Windows NT. This ActiveX container program allows the interface aspects of the program 330 to be shared by other programs. This alleviates the need for a separate program to generate its own interface program to the historical database 310 and also to provide the graphical user interface (GUI) with a display 334.

In operation, the model building program is illustrated with a series of blocks disposed over the block 330. The first is an extractor block 336, which is operable to interface through an interface block 338 with the program 330. The program 330 has its own interface 340 for interfacing with the historical database 310 for extracting information therefrom. Information is then extracted from the database 310 through interface 340 under the control of program 330 and then this information is accessed via interface 338 for use by the extractor block 336. The extractor block 336 is operable to build the dataset as illustrated in block 344 which involves preprocessing the data, as described hereinabove. This will then provide a local dataset 346 for use in building the model. Once the dataset has been defined, the program will then flow to a block 348 which will build the model. This was described hereinabove with respect to FIG. 1 and the preprocess and model building aspects of FIGS. 15 through 20.

When building the model, it is necessary to define the model in terms of how the data is processed therethrough. Therefore, the model will implement a plurality of transforms. This transform list essentially defines the model, along with other parameters thereof. This transform list can then be utilized with the neural network model to provide starting parameters therefor. The creation of these transform lists is described in U.S. patent application Ser. No. 08/450, 086, entitled "METHOD AND APPARATUS FOR AUTOMATICALLY CONSTRUCTING A DATA FLOW ARCHITECTURE", which was filed May 25, 1995. This U.S. Patent Application is incorporated herein by reference. The transform list is stored in a block 349, which transform list basically defines the model. Once the transform list is defined, this transform list can later be transferred to the run-time model 300, as will be described hereinbelow. It is important that the model be completely evaluated and analyzed prior to placing it online, as such an action could be detrimental if there is some error due to such things a tag being misnamed.

Once a model has been completed, this model can been analyzed in the block 348 to determine the best operation of that model to provide what the user considers as an optimum representation of the plant in order to provide the appropriate prediction. The program will then flow to a configuration block 350. The configuration block 350 is the step wherein the actual run-time model is configured for its operation, this being related to parameters such as the length of time it runs, the way it interfaces with the historical database 310, etc. For example, it is important that the tag for the predicted output is correct such that when data is transferred from the run-time model 300 to the historical database 310, it is input to the correct location and is tagged correctly. This will be performed through an interface block 352 which will then interface through the program 330 and interface block 354 associated with the program 330 to the database 310. A test can be performed at this step through the interface 352 in order to ensure that the model will in fact exchange information with the historical database 310, write the correct information thereto and read the correct information therefrom. Additionally, the configuration model block 350 will test to see if the system can in fact read a given location and write information thereto, if necessary. There are some systems that block the read or write capabilities of the predictive tag and it is important after building a model that a test is run before going on-line with the model. Additionally, the test procedure will ensure that tags have not been renamed since the historical database was created. Of course, the system will need to be taken out of operation during the test procedure if the DCS is configured in a control loop, as any writing to the historical database could potentially disrupt the operation of the plant.

Once the model has been configured, it is then transferred to the run-time model 300. The run-time model 300 is the program that will basically generate the prediction, store the prediction in the historical database 310 and read information therefrom, such that the operation of the plant can be manipulated. This predicted value can be utilized for display purposes or it can be utilized in a control loop to generate the input values to the plant 302. This is described hereinabove with respect to FIG. 21. This will interface through an interface 355 to the program 330 and the program 330 will interface with database 310 through interface 356. It should be under that the interfaces 340, 354 and 356 are basically many interfaces that are associated with the program 332. Also, the interfaces 338, 352 and 355 are interfaces associated with the modeling program that allow it to interface through the ActiveX interface with program 330.

Figure 23:
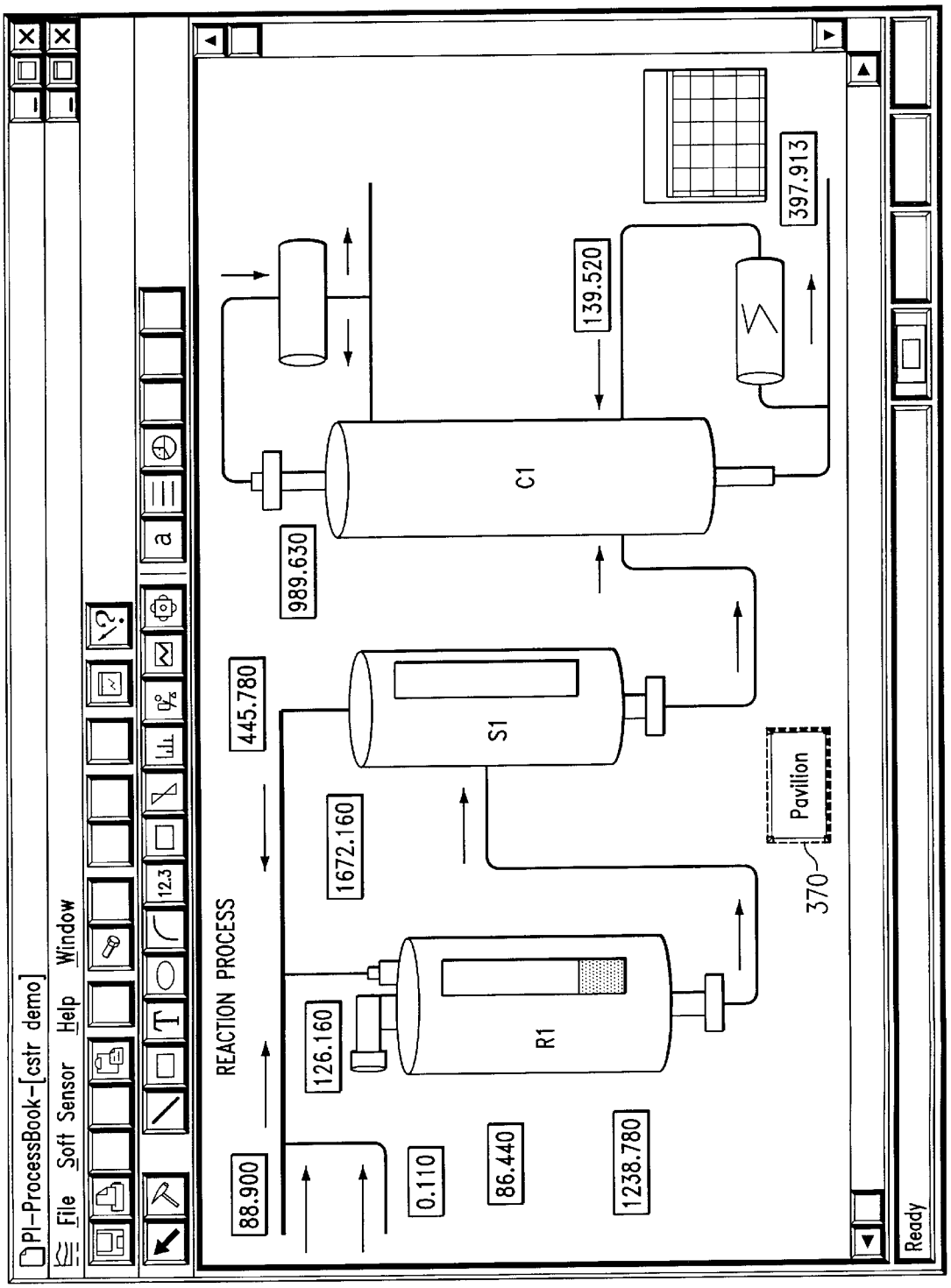
FIGS. 23, 24 and 25 illustrate a data wizard for an extraction operation.

Referring now to FIG. 23, there is illustrated a screen capture for the program 330, this program 330 being a third party program. In general, this program provides a graphical interface with various outputs and inputs displayed. This is a conventional program that allows monitoring of the historical database 310. Associated with this screen capture is a proprietary block 370 which in general represents a "button" that can be selected with a pointing device. This will launch the model building program.

Figure 24:
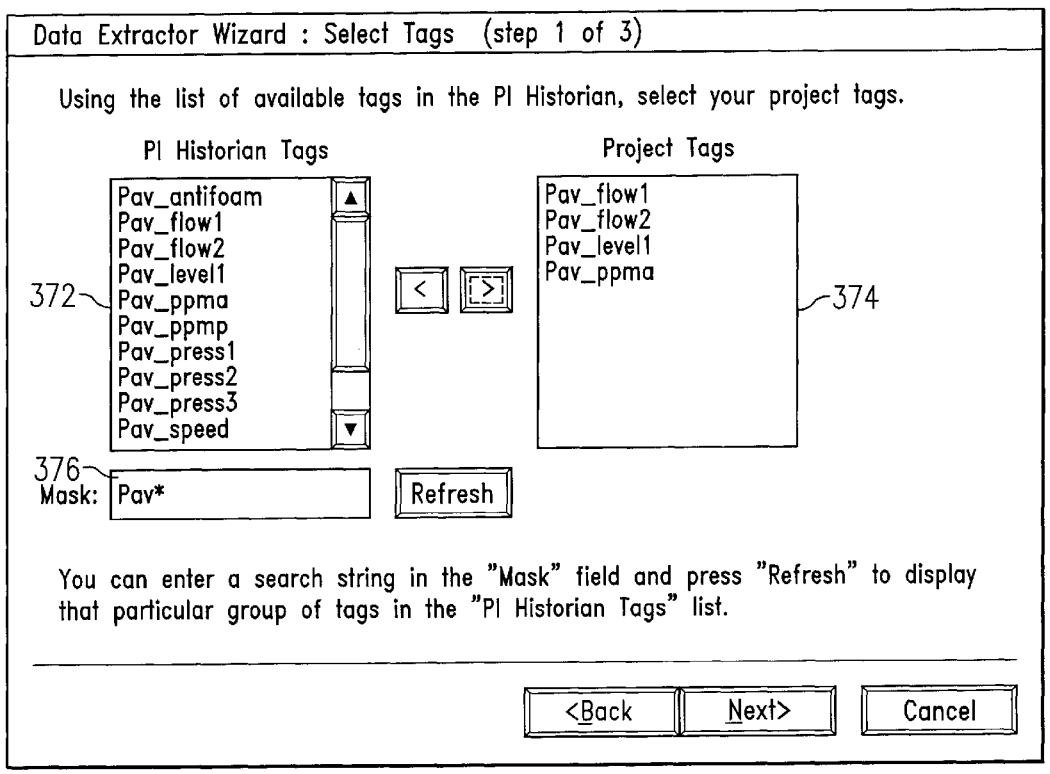

Referring now to FIG. 24, there is illustrated a screen capture of a first Wizard for initiating the model building process. FIG. 24 is associated with the data extractor Wizard, which implements the extractor feature. There are provided two windows, a window 372 and a window 374, the window 372 representing the various historian tags that are stored in the database 310. These can be selected with a masking function in a window 376 to select only certain tags, otherwise all tags that are stored in historian database 310 will be selected. Certain ones of the tags 372 can be selected for transfer to the window 374. These are in general the tags that are utilized for building the model. They will be used for building the dataset. Once the tags that are available in the database are selected for the model building process, the Wizard is advanced to the next step.

Figure 25:
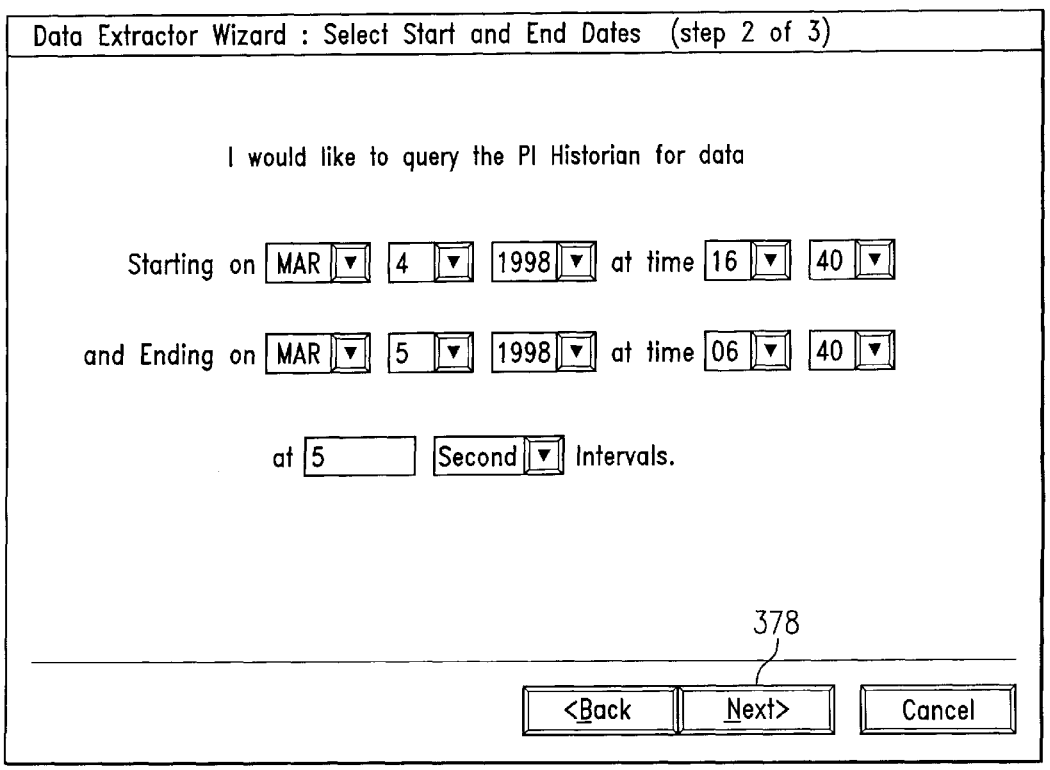

Referring now to FIG. 25, there is illustrated the second step of the data extractor Wizard. In this FIGURE, the screen capture is illustrated for selecting the start and the end dates for the data extraction. As noted hereinabove, the data for each tag will have a time-stamp associated therewith. In some applications, only a certain range of data is necessary and, therefore, this range can be selected at this step. The interval can be selected which, as described hereinabove, allows all the data to be placed onto the same time base. This is an extrapolation operation described hereinabove. Once the start and end dates are selected, the Wizard will flow to the next operation, which is the operation of building the dataset. Once the advance button 378 is selected, then the dataset 346 will be built utilizing the data extracted from the historian database 310 in accordance with the information in window 374. The information in the screen capture of FIG. 24 and the information in the screen capture of FIG. 25 are utilized to build this dataset from data that is stored in the historian database. It should be understood that this extraction routine that is run with the accessed information is an extraction routine that is designed specifically for the type of data contained therein in the historical database 310.

Figure 26:
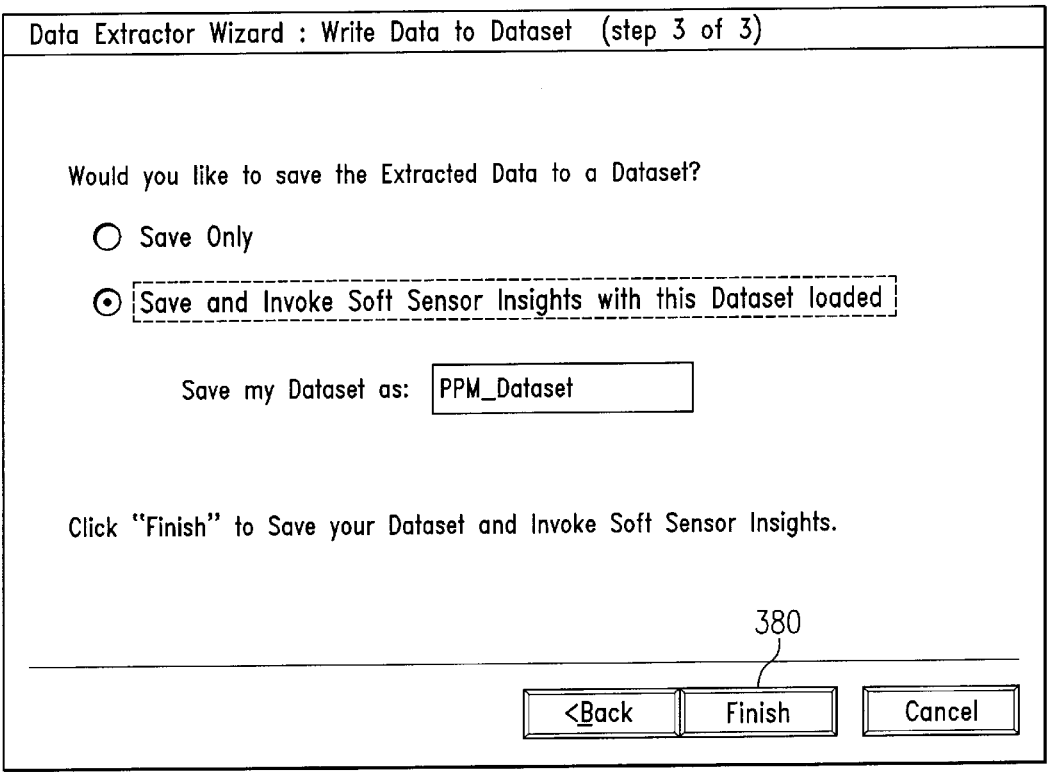

Referring now to FIG. 26, there is illustrated the last screen capture in the data extractor Wizard. In this screen capture, the user is prompted to save the data as a defined name. The user also has the ability to invoke the program for building the model once this data set is defined. Once complete, a button 380 is selected, launch the extraction routine to complete the data extraction Wizard. If the save operation was associated with the invoke command, then the model building will initiated. Once the data is extracted, the user can then preprocess this data, build a model, analyze the model and add run-time and transforms to the on-line transform list in the on-line dataset 349 such that it can essentially generate the dataset for on-line use, as defined by the on-line transform list in block 349. This on-line dataset in block 349 can be utilized in the next step.

Figure 27:
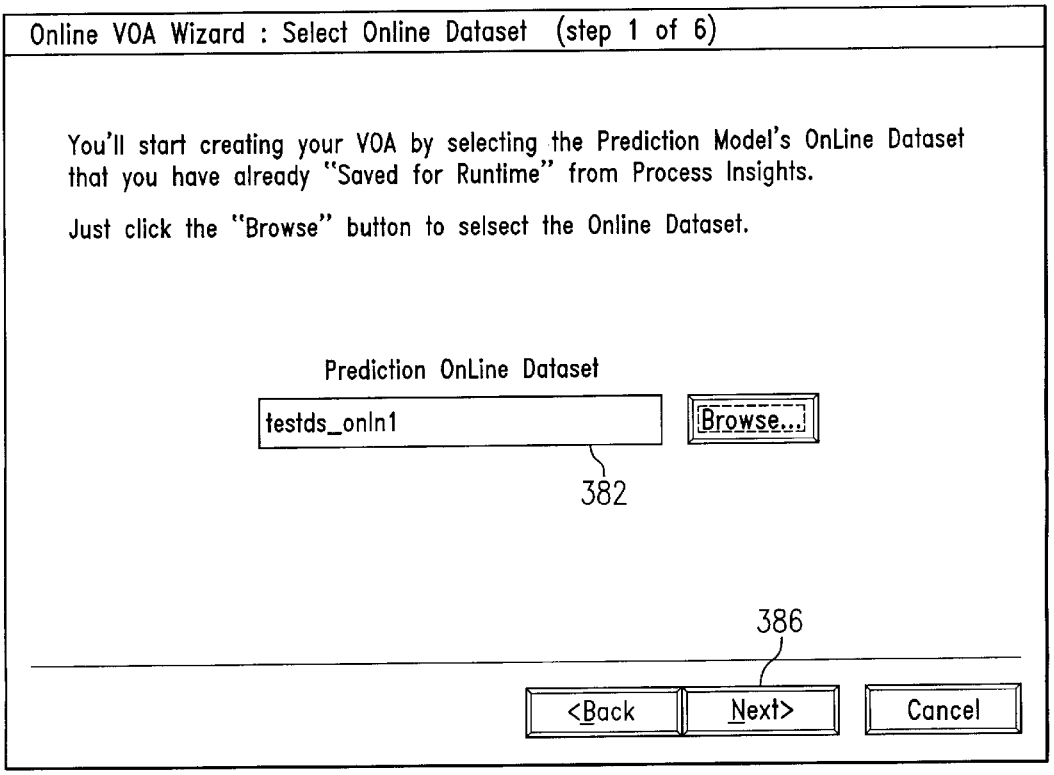

Referring now to FIG. 27, there is illustrated the first screen capture in the Virtual On-line Analyzer (VOA) Wizard which implements the configuration operation. In this data screen capture, the dataset for use with the prediction is first selected in a window 382. This can be the dataset that was just generated or it can be a different online dataset retrieved from memory, which was created in a previous operation. Once the dataset is selected, an advance button 386 is selected.

Referring now to FIG. 28, there is illustrated the next screen capture for the VOA Wizard. In this step, the dataset variables can be viewed and the input tags can be viewed. These can be edited to correct the variable-input tag pair. The reason for this is that it is not necessary for the off-line system to utilize the same tags. Therefore, if the dataset is created with different tags or the user changes them, there must be some type of mapping between the historical database 310 and the dataset 346. This is provided by the screen of FIG. 28. It can be seen in the example in FIG. 28 that they are the same. One reason that they may not be the same is that the previously created model that is being utilized may have been created with old data that has different tags. A system administrator may have changed the tags since the model was created.

Referring now to FIG. 29, there is illustrated the next screen in the operation of the VOA Wizard. In this step, the model is configured, the mapping defined and then a read test performed. The read test for the input tags is basically a system wherein the variable is read for its current value from the historical database 310. This is primarily for the purpose of insuring that the tag has not changed. Since the age of the data is possibly greater than the update to the system by a system administrator, it is possible that the data was taken on a first tag but now the tag name has been changed in the historical database 310. Therefore, this provides some control as to how a tag can be read and if it can in fact be read. This essentially insures that the system will still read a tag under the current configuration of the historical database 310.

Referring now to FIG. 30, there is illustrated the next step in the VOA Wizard. This deals with the output tag or the predicted output that is provided by the model. In the example illustrated in FIG. 30, the dataset variable is illustrated as being "Pavi_ppma_0_p_1". Initially, the system will always bring the output tag up as the dataset variable. The dataset variable, as noted hereinabove, is the predicted output variable as it is defined in the off-line operation. However, it is important to ensure that the dataset variable is the same as that in historical database 310 when in the on-line mode. This can be edited by an edit button to change the value thereof. Once this is selected, the next screen as illustrated in FIG. 31 is selected.

In the next screen of the VOA Wizard a test is performed. The test is performed by reading the output value or writing the output value. Basically, if the output tag is correct, this does not necessarily ensure that a user can write to the historical database 310 at this tag. Therefore, the output tag, which has been changed to "Pav_ppmp" is read from the system. This ensures that a Read can be performed. However, it is then necessary to change the value and then perform a write test by selecting a write test button 390. Once the write test has been performed, then a read test is performed on the historical database 310 by selecting a read test button 392. If the same information is read, then this indicates that a run-time model could be constructed with this model created or modified in the off-line mode. Of course, the Runtime Application Engine (REA) must be paused at this time to ensure that it does not output any predicted values during testing, as this testing is performed utilizing the actual historical database.

Figure 32:
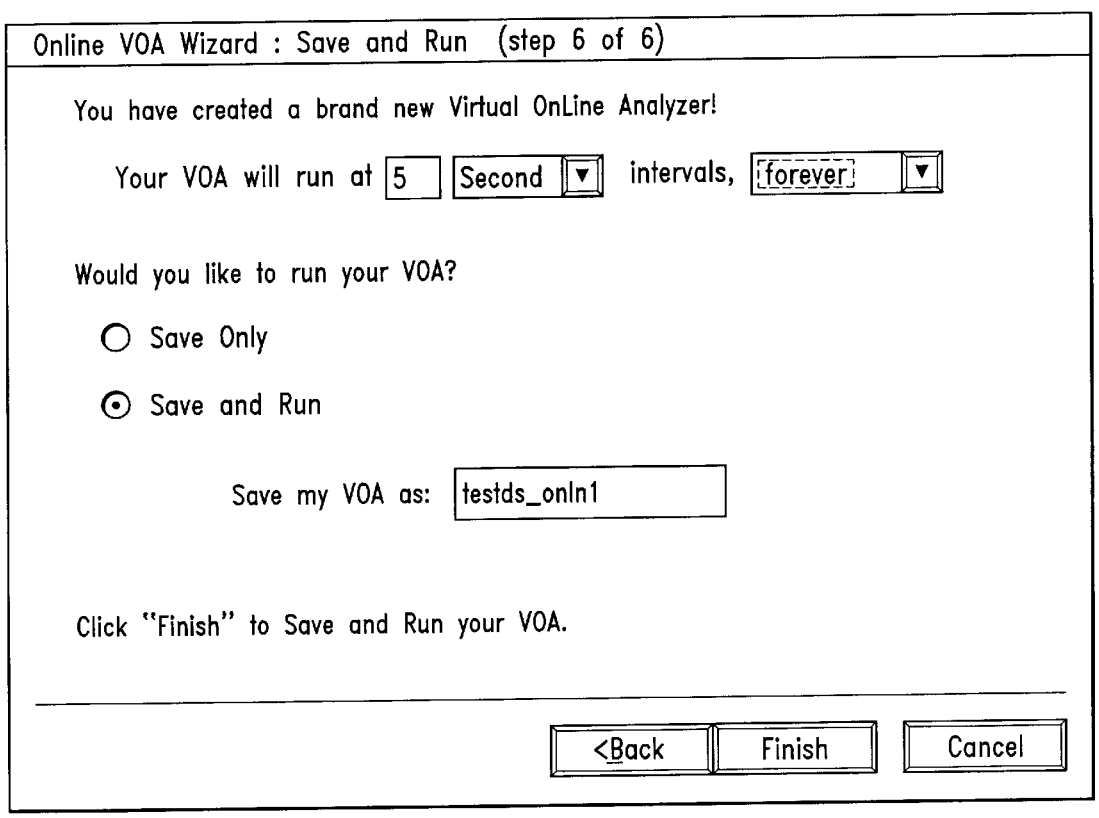
Figure 33:
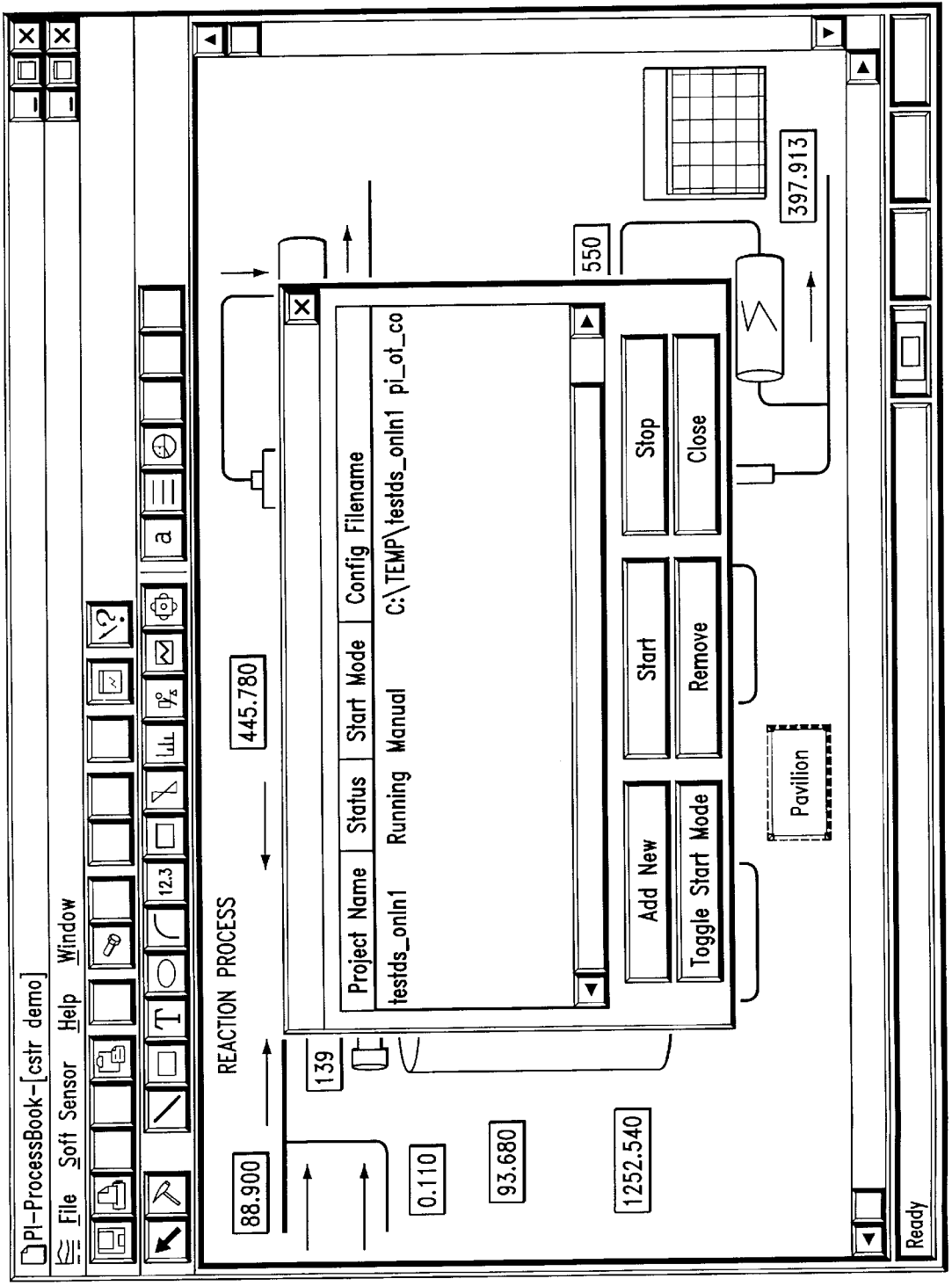

As noted hereinabove, once the model has been configured such that it now correctly maps to the historical database 310, then the parameters for that model can be transferred to the run-time model 300, as illustrated by the next VOA Wizard in FIG. 32. Once transferred to the run-time model 300, a monitoring routine can be initiated, FIG. 33. This monitoring routine is essentially a routine that operates in conjunction with the third party monitoring software program 330 in order to allow the operation of the run-time model 300 to be monitored.

Figure 34:
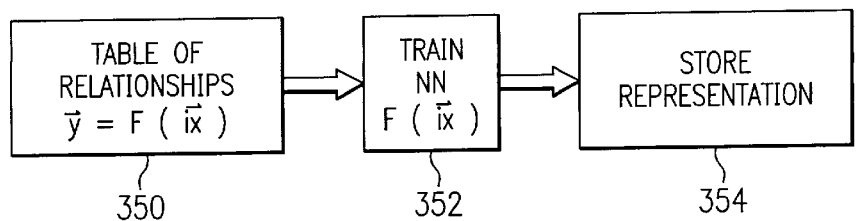
FIG. 34 illustrates a flow diagram for training a neural network with a table of relationships.

Referring now to FIG. 34, there is illustrated a flow diagram illustrating the operation wherein a neural network is trained on a table of relationships. In general, neural networks are trained utilizing a historical database. This database includes data regarding input values taken over time and corresponding output values therefor. In order to predict the output values from the input values, a conventional neural network or any non-linear model can be trained on this set of data. Once trained, the neural network will contain a stored representation of the original data. In some systems, the dataset represents the operation of a plant. However, neural networks can also be utilized to provide a model any relationship wherein the output is some function, linear or non-linear, of an input(s). The following equation will relate an input to an output, the output being the vector y with the input being the vector x wherein the relationship between y is set forth as follows:

$$\bar{y} = F(\bar{x})$$

In general, certain applications utilizing a spreadsheet will require an output value to be calculated from an input value. This input value is generally related to the output through some type of function. This can be a linear function or a non-linear function, it only being noted that the spreadsheet will allow this equation to be calculated. Depending upon the equation, this can be very time consuming from a process standpoint. In fact, there may be some relationships that are represented by nothing more than large tables of relationships, for example, steam tables, which generally relate such things as pressure, volume, enthalpy and temperature to each other. In general, these are nothing more than measured values which have associated therewith the inherent inaccuracies of the measurement. As such, they represent a non-linear system and are representable by a neural network. Other physical property tables that can be represented by a neural network are as follows: psychrometric tables; refrigerants properties; spherical segment; compound interest factors; caustic property tables (enthalpy concentration diagrams); latent heats; specific heats; thermodynamic properties of certain compounds; and pressure/enthalpy diagrams. These tables are not exhaustive and could extend to many other relationships which typically would be looked up in a table. This could even include such things as drag coefficients for aerodynamic systems and tables relating to the mechanical properties of materials involving such things as stresses and strains.

Referring further to FIG. 34, the table of relationships is illustrated as a block 350, which contains the actual data for the table of relationships. In general, this is a set of inputs and outputs where the outputs are related to the inputs. This can constitute a great deal of information which is available to a user for the purpose of looking up output information given certain input information. In fact, steam tables require selecting certain "region" tables once the pressure, volume and enthalpy are known. This table of relationships in block 350 is utilized to train a neural network as illustrated in block 352. Again, as described hereinabove, any type of non-linear model can be utilized. After training, this representation is stored in a neural network, as illustrated in block 354. It should be understood that the neural network is a non-linear model and provides a predicted output given a set of inputs by mapping the inputs through a stored representation of the tables. Since it is a model, there may be an inaccuracy associated with this model. For example, if a set of inputs were input to the neural network, and the predicted output compared with the output selectable from the tables, that being the output it was trained on, there might be an error between the predicted value and the actual value. However, this error should be within a tolerable range and the neural network provides a much faster processing method by which an output could obtained, in some instances. Therefore, if one considers that the actual output is that defined in the table, the predicted output may have some error associated with the predicted output due to the modeling operation, but this can be tolerated due to the fact that the prediction operation arrives at an output value much quicker.

In the situation where there is a plurality of physical property tables required to define the physical properties, such as that associated with steam tables having different regions, the neural network is trained on each of the regions separately. The reasons for the separate tables is that there may be discontinuities between the regions. In order to train the network over these multiple regions, separate inputs are provided to determine which region is selected. If there were only two regions, then a single input could define which region is present by being high or low, or two inputs could be utilized with a high value indicating the selection of the associated region. The latter method would be utilized for multiple regions. When processing data through the neural network, then it is only necessary that the input associated with that region be placed at the correct value. This would then require a separate input value for a given region or regions to allow mapping through the portion of the network associated with region.

In addition allowing a plurality of physical property tables to be modeled by the network, the creation of the non-linear predictive model with multiple tables allows for mapping an input over any non-linearities that may exist in the boundaries between regions defined by the tables, the steam tables for example. This provides for a system that only requires a set of inputs to be entered into a spreadsheet and then processed through the network to yield an output by mapping the inputs through a stored representation of physical property tables related to the inputs.

Figure 35:
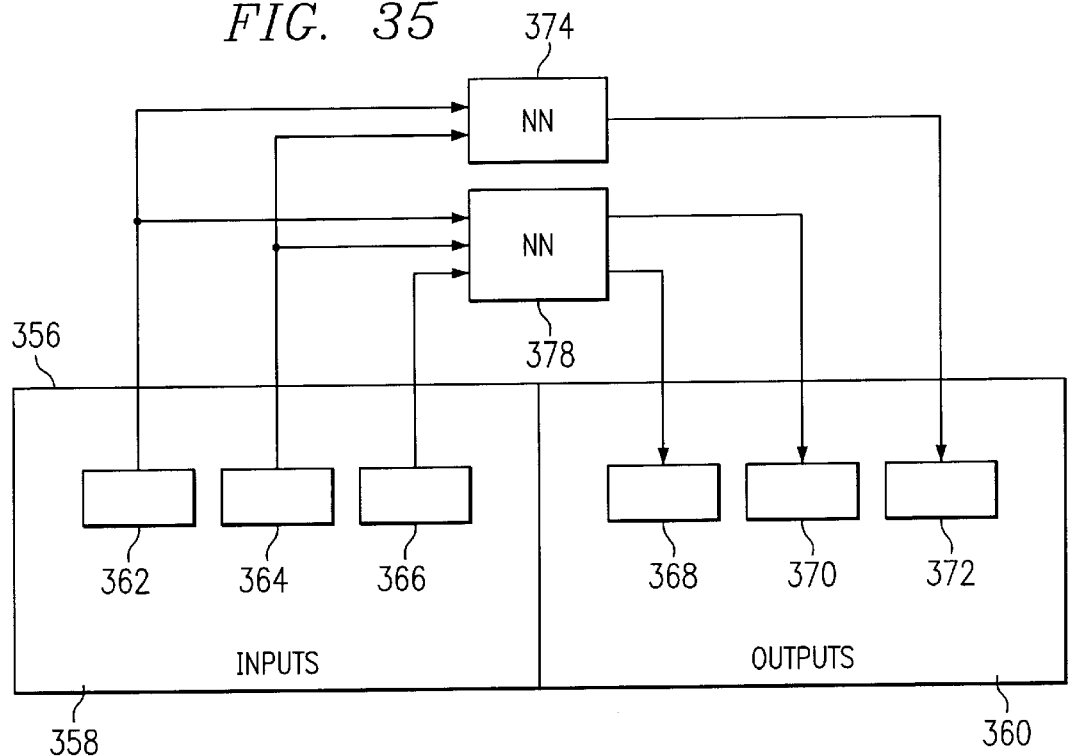
FIG. 35 illustrates a spreadsheet utilizing a neural network to generate the predicted outputs from given inputs.

Referring now to FIG. 35, there is illustrated a spreadsheet 356 having a set of input values and output values, set forth in two regions, a region 358 for the inputs and a region 360 for the outputs, which are typically arranged in rows and columns. Only a single row of values has been illustrated with three input values 362, 364 and 366 and three output values 368, 370 and 372. Typically, these input values 362–366 will somehow be related to the output values 368–372. However, these output values merely represent the values in particular columns. It is necessary that the creator of the spreadsheet define the relationship with each output variable and which input it is related to. In the illustrated embodiment of FIG. 33, these relationships are set up such that the variables 362 and 364 constitute inputs to a neural network 374. This provides a single output, which is a predicted output, as the output variable. A second neural network 378 is provided having three inputs, those associated with variables 362, 364 and 366. This provides two predicated outputs constituting the values 368 and 370. It is important to note that these are predicted outputs which are derived from the stored representations in either of the neural networks 374 and 378.

Figure 36:
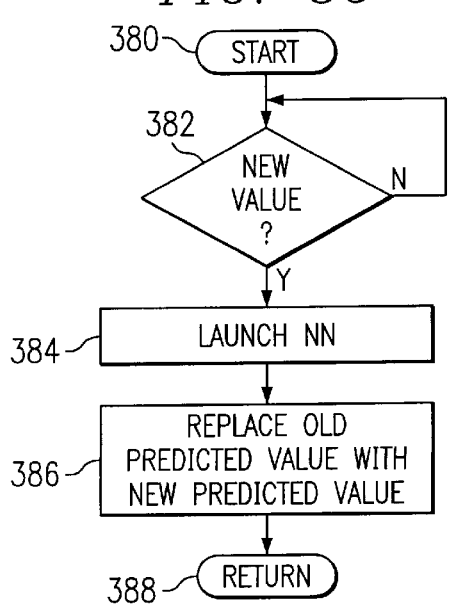
FIG. 36 illustrates a flowchart depicting the operation of generating predicted values for a spreadsheet utilizing a neural network.

Referring now to FIG. 36, there is illustrated the operation of updating one of the output variables. The program is initiated in a block 380 and then proceeds to a decision block 382 wherein the existence of a new input value is determined. If a new input value is input, or previous value has been changed, the program will flow to a block 384 in order to launch the neural network associated with that input. There may be multiple neural networks and each neural network having that input variable associated with its input dataset will be launched and then new output values provided as the prediction. The flow chart will then flow to a function block 386 to replace the old predicated value with the new predicated value and then to a Return block 388.

Figure 37:
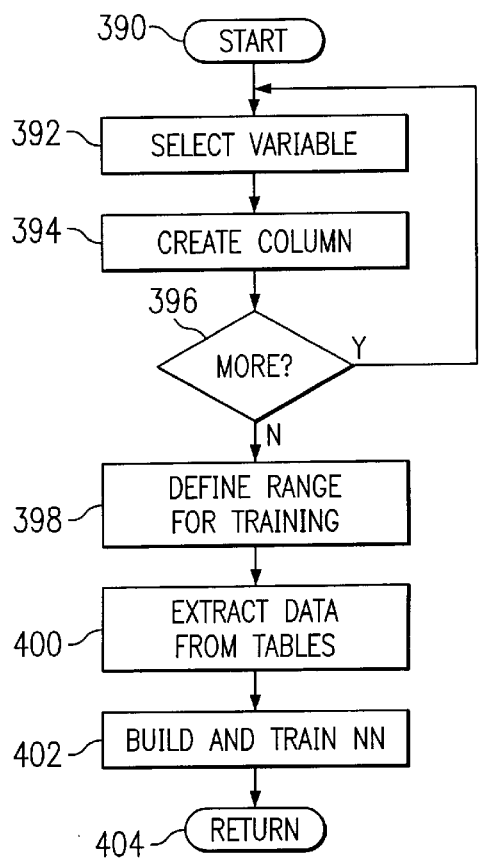
FIG. 37 illustrates a flowchart depicting the operation of building a neural network for a spreadsheet application.

Referring now to FIG. 37, there is illustrated a flow chart depicting the creation of one of the neural networks 374 or 378. The program is initiated at a start block. 390 and then proceeds to a function block 392 wherein a user is allowed to select various variables. These variables are extracted from a dataset that is associated with a given set of tables. The tables may have a plurality of inputs and a plurality of outputs. The user is allowed to select these variables and then allowed to create a column in a block 394. Once this variable is inserted into the spreadsheet and defined as an input or an output, the program will flow to decision block 396 to determine if there are more variables to be inserted into the creation of the spreadsheet. If so, the program will flow back around to the input of function block 392. Once all columns have been created and all variables have been selected, the program will flow to a function block 398 to define the range for training of a neural network. It should be understood that at this point, the user or creator of the spreadsheet has defined what inputs and outputs from a set of tables will be utilized to train the neural network, i.e., the training dataset. It may be all of the inputs and all of the outputs or it may be a restricted set. Further, for each input variable and output variable selected to train the neural network, it may be desirable not to utilize all of the values provided thereby and to restrict the number of values for a given variable that are utilized for the training operation. Once the range has been selected, the program will flow to a function block 400 to then extract the data from the tables to build the dataset. The program will then flow function block 402 to build and train the neural network as described hereinabove. The program will then flow to a Return block 404.

Figure 38:
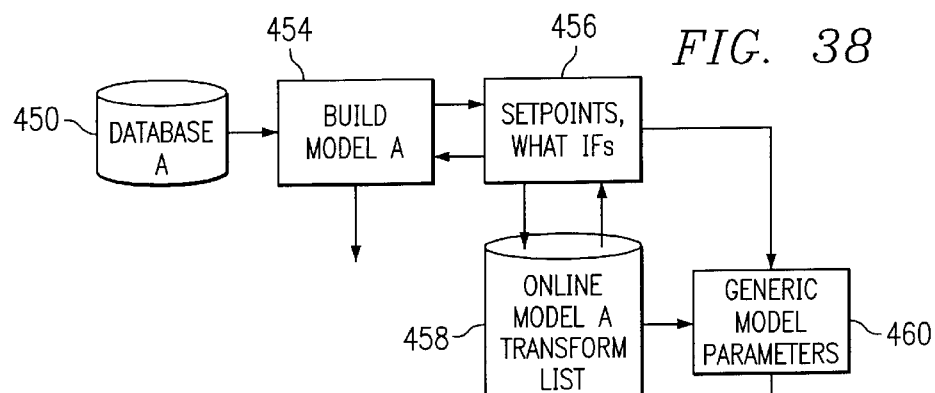
FIG. 38 illustrates a block diagram illustrating the transfer of generic model parameters between two different models during the creating stage.

Referring now to FIG. 38, there is illustrated a block diagram of an alternate embodiment for building a model. Whenever a model is built, the first thing that is required is a database. In the illustrated embodiment of FIG. 36, there are illustrated two databases, a database A 450 and database B 452. The database A 450 is utilized for building a first model, referred to as a model A. This is facilitated with a block 454 which operates in accordance with the operation described hereinabove with reference to FIG. 1; that is, the data is processed through a preprocessing operation and then through an analysis and configuration operation. During this operation, various setpoints and "what-ifs" are defined and analyzed, as illustrated by block 456. This will be utilized in generating the transform list for an on-line model. For model A, this is illustrated in block 458. This was described hereinabove in U.S. patent application Ser. No. 08/450,086, entitled "METHOD AND APPARATUS FOR AUTOMATICALLY CONSTRUCTING A DATA FLOW ARCHITECTURE", which was filed May 25, 1995, which was incorporated herein by reference.

After generation of the model, there are various aspects of the model, such as certain transforms or sequences of transforms that could be considered generic by the user for building another model of that type. Additionally, there are certain preprocess operations that would be generic to the building of a similar type model. For example, if the model were associated with a boiler application or with an emissions sensor, a skilled user could determine what starting points would exist in building a model. For example, there may be certain delays that are necessary to consider when building a certain kind of model from a conventional or standard set of data. The skilled user could define what these starting points were as a generic set of model parameters. These model parameters could be certain transforms, certain sequences of transforms, certain setpoints, certain delays, etc. These are defined as generic model parameters, which are stored in block 460 for use in generating another model of a similar application. Thereafter, a user can provide these to other users' system. These could even be provided in an accessible location which could be accessible over a global communications network. Thereafter, when building a second model utilizing the database B 452, these parameters could be downloaded into the on-line model B transform list, in block 470, for use by the analysis portion in setting the setpoints and the "what-ifs" in a block 472 wherein the model is built as indicated in block 474. By allowing these generic model parameters to be provided between two separate networks, this facilitates the building of the model.

Figure 39:
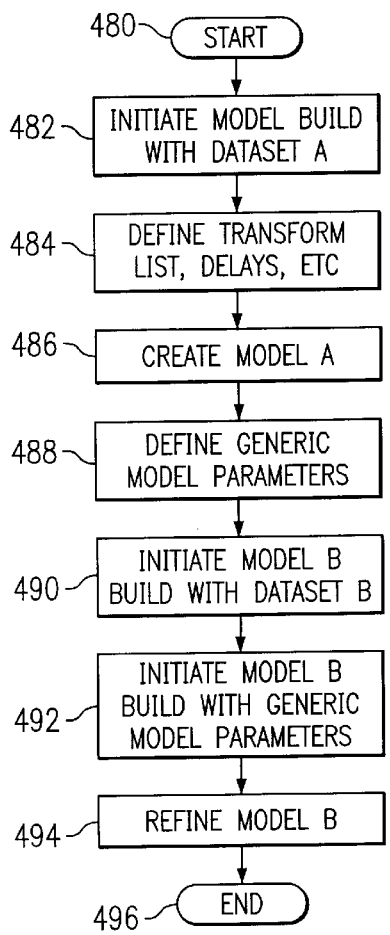
FIG. 39 illustrates a flowchart depicting the creation of generic model parameters.

Referring now to FIG. 39, there is illustrated a flow chart for this operation, which is initiated at a block 480. The program then flows to block 482 wherein the building of the model A, initiated using the dataset A. The program then flows to a function block 484 to define the transform list, delays, setpoints, etc., associated with the building of the model A. These are defined by the skilled user. The program then flows to a function block 486 to build the model A and then to function block 488 to define the generic model parameters. Of course, these are subjective and are determined by the skilled user. Once these model parameters are set, then the program can flow to a block 490 wherein the building of the model B is initiated utilizing the dataset B. The program will then flow to a function block 492, wherein the building of the model B will be initiated utilizing this generic set of model parameters. These were the model parameters defined by the skilled user in block 460. This will give an initial setting for the model creation of such things as the preprocess parameters and the transform lists. Thereafter, the new user can refine the model parameters in accordance with the operation described hereinabove, such as by modifying the preprocess operation, adding or deleting a data flow transform, etc. As set forth in a function block 494, the program will then flow to an End block 496.

In summary, there has been provided a predictive network for operating in a run-time mode and in a training mode with a data preprocessor for preprocessing the data prior to input to a system model. The predictive network includes a non-linear network having an input layer, an output layer and a hidden layer for mapping the input layer to the output layer through a representation of a run-time system. Training data derived from the training system is stored in a data file, which training data is preprocessed by a data preprocessor to generate preprocessed training data, which is then input to the non-linear network and trained in accordance with a predetermined training algorithm. The model parameters of the non-linear network are then stored in a storage device for use by the data preprocessor in the run-time mode. In the run-time mode, run-time data is preprocessed by the data preprocessor in accordance with the stored data preprocessing parameters input during the training mode and then this preprocessed data input to the non-linear network, which network operates in a prediction mode. In the prediction mode, the non-linear network outputs a prediction value.

Although the preferred embodiment has been described in detail, it should be understood that various changes, substitutions and alterations can be made therein without departing from the spirit and scope of the invention as defined by the appended claims.

What is claimed is:

1. A method for creating a representation of a plant and incorporating it into a run time prediction system for generating predicted output values representing the operating parameters of the plant during operation thereof, comprising the steps of:

providing a historical database representing the operation of the plant and comprised of data associated with plant inputs and plant outputs;

extracting data from the historical database and creating a dataset of variables corresponding to the inputs and outputs from the historical database;

creating an off-line predictive model of the plant utilizing the created dataset to predict a plant output and defined by off-line model parameters;

creating an on-line model for generating predicted output values in real time during the operation the a plant and defined by on-line model parameters; and replacing the on-line model parameters with the off-line model parameters after generation thereof.

2. The method of claim 1, wherein the historical database is integral with the operation of the plant in real time.

3. The method of claim 1, wherein the inputs to the plant are manipulatable variables for operating the plant.

4. The method of claim 1, wherein the outputs of the plant in the historical database constitute measurable variables which are measured outputs from the plant during operation thereof.

5. The method of claim 1, wherein the step of extracting data from the database and creating a dataset includes the step of preprocessing the data extracted from the historical database to modify the data in accordance with a predetermined preprocess routine.

6. The method of claim 1, wherein the step of creating an off-line predictive model comprises training a neural network with the data in the dataset to create a stored representation thereof with the neural network mapping the inputs thereto through the stored representation to provide the predicted output values.

7. The method of claim 1, wherein the predicted output values comprise an unmeasured output in the historical database and wherein the outputs in the historical database constitute measurable outputs.

8. The method of claim 1, and further comprising the step of testing the off-line predicted model with data in the historical database prior to the step of replacing.

9. The method of claim 8, wherein the step of testing comprises reading select ones of the variables defined by the off-line predictive model from the historical database to ensure that the variables in the created off-line predictive model can be read.

10. The method of claim 8, wherein the step of testing comprises writing to the historical database values that correspond to variables in the created off-line predictive model to ensure that data can be written to these variable locations in the historical database.

11. The method of claim 8, wherein the step of testing comprises reading from a location in the historical database corresponding to the predicted output value as defined by the off-line predictive model to ensure that the predicted output value name in the created off-line predictive model corresponds to a variable name in the historical database.

12. The method of claim 8, wherein the step of testing comprises writing the predicted output value to a corresponding location in the historical database to ensure that there is such a location in the historical database to ensure that the step of replacing will replace the on-line model parameters with the correct off-line model parameters.

13. The method of claim 8, wherein the operation of the on-line model will be paused during the step of testing.

14. A method for assisting a user in creating a representation of a plant and incorporating it into a run time prediction system for generating predicted output values representing operating parameters of the plant during operation thereof, comprising the steps of:

providing a display;

providing a historical database;

displaying an extraction graphical assist device with associated interactive instructions to assist the user in extracting data from a historical database representing the operation of the plant and comprised of data associated with plant inputs and plant outputs, and creating a dataset of variables corresponding to the inputs and outputs from the historical database when the user has completed the instructions;

displaying a model building graphical assist device with associated interactive instructions to assist the user in creating an off-line predictive model of the plant utilizing the created dataset to predict a plant output and defined by off-line model parameters;

displaying a graphical assist device with associated interactive instructions to assist the user in replacing on-line model parameters of an on-line model with the off-line model parameters after generation thereof, which the on-line model is operable to generate predicted output values in real time during the operation the a plant and defined by the on-line model parameters.

15. The method of claim 14, wherein the step of assisting the user in extracting data from the database and creating a dataset includes the step of assisting the user in preprocessing the data extracted from the historical database to modify the data in accordance with a predetermined preprocess routine.

16. The method of claim 14, wherein the step of assisting the user in creating an off-line predictive model comprises assisting the user in training a neural network with the data in the dataset to create a stored representation thereof with the neural network mapping the inputs thereto through the stored representation to provide the predicted output values.

17. The method of claim 14, and further comprising the step of displaying a test graphical assist device with associated interactive instructions to assist the user in testing the off-line predicted model with data in the historical database prior to the step of assisting to replace.

18. The method of claim 17, wherein the step of assisting the user to test the off-line model comprises assisting the user in reading select ones of the variables defined by the off-line predictive model from the historical database to ensure that the variables in the created off-line predictive model can be read.

19. The method of claim 17, wherein the step of assisting the user to test the off-line model comprises assisting the user in writing to the historical database values that correspond to variables in the created off-line predictive model to ensure that data can be written to these variable locations in the historical database.

20. The method of claim 17, wherein the step of assisting the user to test the off-line model comprises assisting the user in reading from a location in the historical database corresponding to the predicted output value as defined by the off-line predictive model to ensure that the predicted output value name in the created off-line predictive model corresponds to a variable name in the historical database.

* * * * *